United States Patent
Uematsu et al.

(10) Patent No.: US 9,607,439 B2
(45) Date of Patent: Mar. 28, 2017

(54) INFORMATION PROCESSING APPARATUS AND INFORMATION PROCESSING METHOD

(71) Applicant: CANON KABUSHIKI KAISHA, Tokyo (JP)

(72) Inventors: Taro Uematsu, Tokyo (JP); Yasumi Tanaka, Funabashi (JP); Tsutomu Nakahara, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 44 days.

(21) Appl. No.: 14/584,032

(22) Filed: Dec. 29, 2014

(65) Prior Publication Data

US 2015/0199850 A1    Jul. 16, 2015

(30) Foreign Application Priority Data

Jan. 16, 2014   (JP) .................................. 2014-006217

(51) Int. Cl.
*G09G 5/00*         (2006.01)
*G06T 19/00*        (2011.01)
(Continued)

(52) U.S. Cl.
CPC ............ *G06T 19/006* (2013.01); *G01B 7/003* (2013.01); *G02B 27/017* (2013.01);
(Continued)

(58) Field of Classification Search
CPC ..... G06T 19/006; G06T 7/0042; G06T 15/20; G01B 7/003; G01B 2210/58; G02B 27/017; G02B 2027/0138
(Continued)

(56) References Cited

U.S. PATENT DOCUMENTS 6,400,364 B1 * 6/2002 Akisada .................. G06T 15/20
                                                    345/420
6,542,151 B1 * 4/2003 Minami .................. G06T 15/02
                                                    345/419
(Continued)

FOREIGN PATENT DOCUMENTS

EP      2423883 A2     2/2012
EP      2818977 A1    12/2014
(Continued)

OTHER PUBLICATIONS

Massachusetts Institute of Technology, Department of Physics, Fall 2009, Review Module: Dot Product, available at: http://web.mit.edu/8.01t/www/materials/modules/Review%20Module%20Dot%20Product.pdf (available as of Oct. 26, 2010; last visited: Apr. 18, 2016) (pp. 1-12).*

(Continued)

*Primary Examiner* — Xiao Wu
*Assistant Examiner* — Sarah Lhymn
(74) *Attorney, Agent, or Firm* — Fitzpatrick, Cella, Harper & Scinto

(57) ABSTRACT

An information processing apparatus comprises: an acquisition unit configured to acquire a viewpoint position of an observer who observes a first three-dimensional virtual object arranged in a virtual space and having at least one cross section; an acquisition unit configured to acquire a normal vector of a first cross section of the first three-dimensional virtual object; an image generation unit configured to generate, based on the viewpoint position of the observer and the normal vector of the first cross section, a second three-dimensional virtual object having a second cross section with a different normal vector from the first cross section; and an output unit configured to output an (Continued)

image of the second three-dimensional virtual object generated by the image generation unit.

11 Claims, 19 Drawing Sheets

(51) Int. Cl.
    *G01B 7/00*         (2006.01)
    *G02B 27/01*       (2006.01)
    *G06T 7/00*         (2006.01)
    *G06T 15/20*       (2011.01)

(52) U.S. Cl.
    CPC ............ *G06T 7/0042* (2013.01); *G06T 15/20* (2013.01); *G01B 2210/58* (2013.01); *G02B 2027/014* (2013.01); *G02B 2027/0138* (2013.01); *G02B 2027/0178* (2013.01); *G02B 2027/0187* (2013.01)

(58) Field of Classification Search
    USPC ....... 345/581, 619, 629, 630, 631, 632, 633, 345/672, 676, 678, 679, 680
    See application file for complete search history.

(56) References Cited

U.S. PATENT DOCUMENTS

| | | | |
|---|---|---|---|
| 6,700,578 | B2 | 3/2004 | Kamata et al. |
| 8,207,909 | B2 | 6/2012 | Okuno |
| 8,633,871 | B2 | 1/2014 | Okuno |
| 8,643,676 | B2 | 2/2014 | Matsui |
| 9,050,038 | B2 | 6/2015 | Sasaki et al. |
| 2002/0186217 | A1* | 12/2002 | Kamata ............... G06T 15/10 345/427 |
| 2008/0106488 | A1* | 5/2008 | Okuno ............... A63F 13/06 345/8 |
| 2009/0017907 | A1* | 1/2009 | Shimizu ............. A63F 13/10 463/31 |
| 2010/0056919 | A1* | 3/2010 | Abe ..................... A61B 8/08 600/443 |
| 2012/0050281 | A1 | 3/2012 | Tanaka et al. |
| 2013/0093756 | A1 | 4/2013 | Davidson |
| 2014/0085298 | A1 | 3/2014 | Matsui |
| 2014/0375687 | A1 | 12/2014 | Tanaka |

FOREIGN PATENT DOCUMENTS

| | | |
|---|---|---|
| JP | H07-253773 A | 10/1995 |
| JP | 2002-366975 A | 12/2002 |
| JP | 2008-009646 A | 1/2008 |
| JP | 2009-247693 A | 10/2009 |
| JP | 2010-066898 A | 3/2010 |
| JP | 2012-053631 A | 3/2012 |
| JP | 2013-069026 A | 4/2013 |

OTHER PUBLICATIONS

Jul. 10, 2015 Combined Search and Examination Report corresponding to foreign counterpart Application No. GB1500628.1.

* cited by examiner

FIG. 6
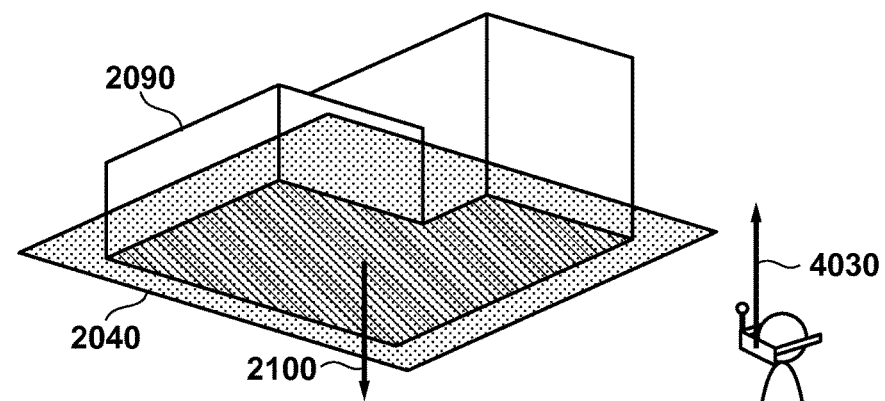
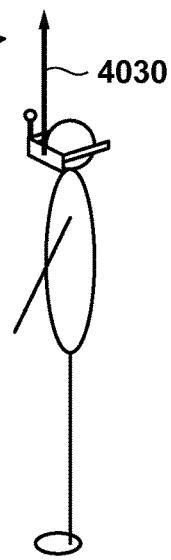
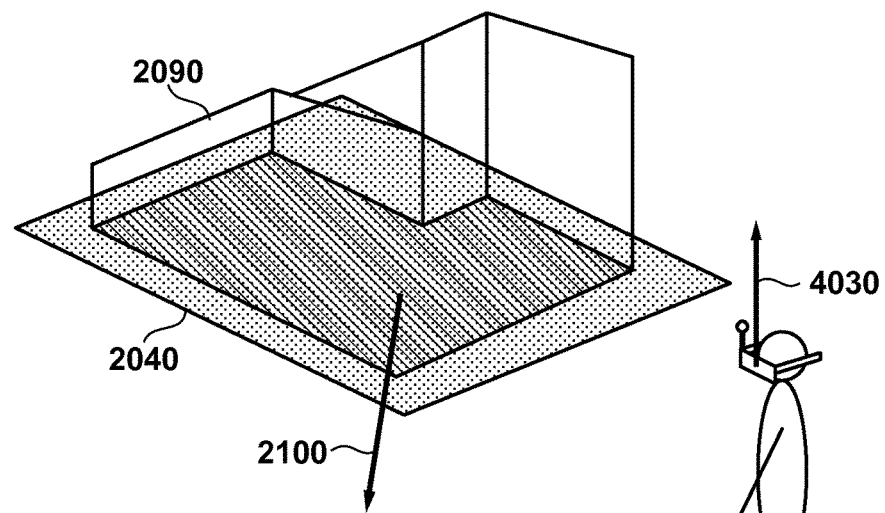
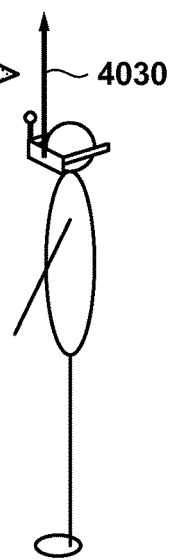

F I G. 14
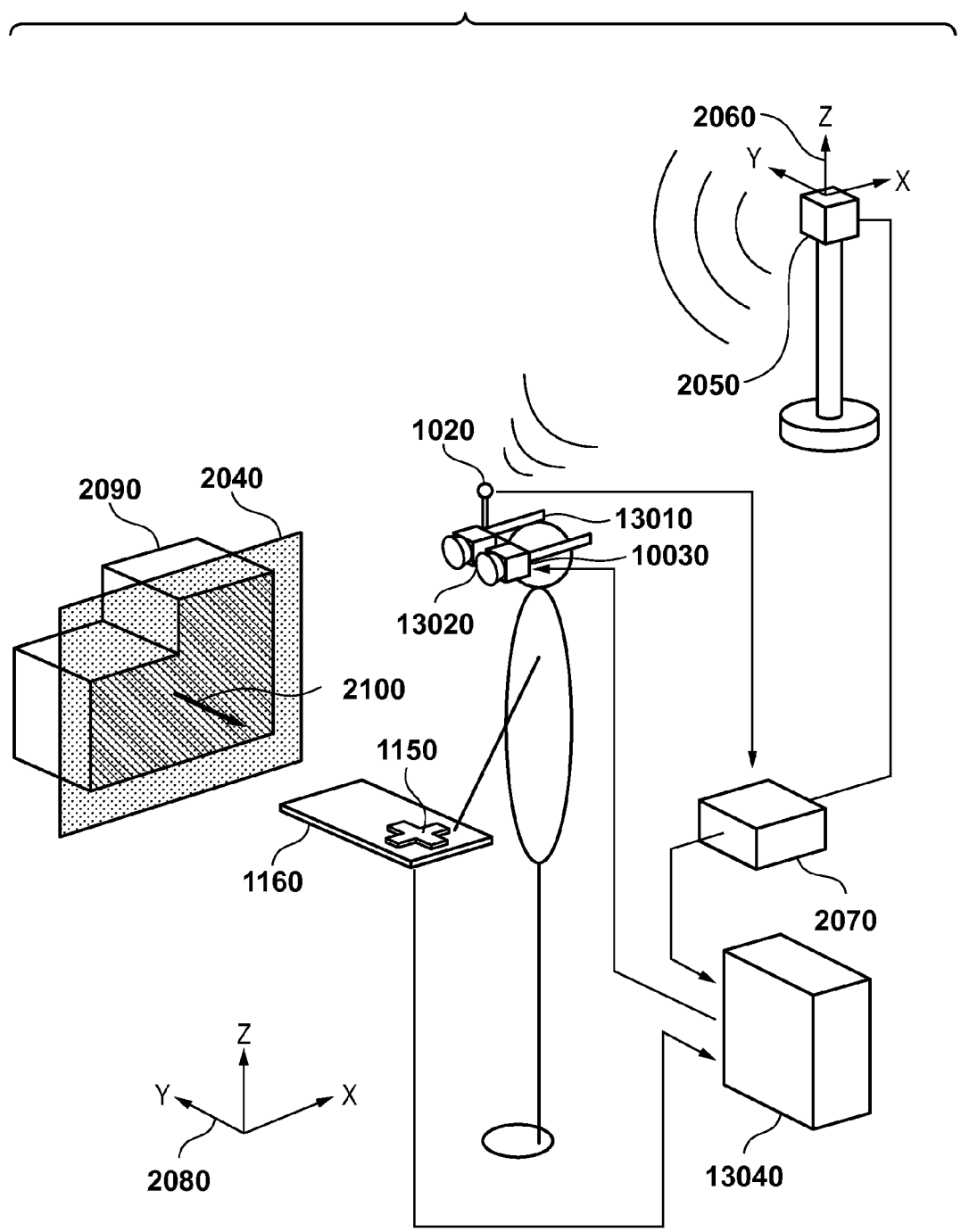

INFORMATION PROCESSING APPARATUS AND INFORMATION PROCESSING METHOD

BACKGROUND OF THE INVENTION

Field of the Invention

The present invention relates to a technique of supporting an operation to a three-dimensional virtual object arranged in a virtual space.

Description of the Related Art

Conventionally, three-dimensional CAD systems are used in the field of manufacturing and design, and can design a component and its cross section while three-dimensionally displaying them. For example, there is known a technique of, when observing a cross section, setting the position and direction of a cross-sectional plane serving as a reference (to be referred to as a cross-sectional operation hereinafter), changing the position of the cross section of a component by an operation on a CAD screen, and observing the cross section.

A virtual reality (VR) system has also been studied, in which design is performed by using a three-dimensional CAD system in a virtual reality space by using a head-mounted display (HMD) (Japanese Patent Laid-Open No. 2012-53631). Further, there is proposed the use of a mixed reality (MR) system in which a physical space and a virtual space are combined by using an HMD (Japanese Patent Laid-Open No. 2010-66898). An operation device that is operated by gripping it with the hand or the like, like a game controller, instead of a mouse or a keyboard, is also used in an environment where an observer wears an HMD and observes a virtual object while walking around a physical space.

However, in the cross-sectional operation during display in VR or MR, a cross section is operated with predetermined buttons of a game controller. When the line-of-sight direction of an observer differs from a predetermined direction, the operation direction of the cross section becomes opposite to the direction in which the observer views the cross section, and the observer may not operate the cross section intuitively.

For example, a case in which a cross section is operated in a coordinate system defined by the origin and three axes (X-, Y-, and Z-axes) of a coordinate system defining a space will be considered. Assume that the game controller is configured so that its up button is associated with a movement in the +Y direction, its down button is associated with a movement in the −Y direction, and a cross-sectional plane parallel to the X-Z plane is operated in the Y-axis direction. In this case, when the observer stands on the X-Y plane and turns his eyes in the +Y direction, the cross-sectional plane moves deep (i.e. away from the observer) with the up button indicating the +Y direction and forward (i.e. toward the observer) with the down button indicating the −Y direction. In this case, the operation direction of the observer and the movement direction coincide with each other, so the observer can perform an operation naturally. To the contrary, when the observer turns his eyes in the −Y direction (e.g. he turns around by 180°), the cross-sectional plane moves toward the observer with the up button indicating the +Y direction and deeper (away from the observer) with the down button indicating the −Y direction. That is, the movement direction becomes opposite to the operation direction of the observer. This is unnatural to the observer, and he cannot operate the cross section intuitively. In some cases, when the cross-section normal direction is not toward the observer (i.e. in the plane normal to the direction of the line between the observer and the cross section), he cannot confirm the cross section.

SUMMARY OF THE INVENTION

According to one aspect of the present invention, an information-processing apparatus comprises: an acquisition unit configured to acquire a viewpoint position of an observer who observes a first three-dimensional virtual object arranged in a virtual space and having at least one cross section; an acquisition unit configured to acquire a normal vector of a first cross section of the first three-dimensional virtual object; an image generation unit configured to generate, based on the viewpoint position of the observer and the normal vector of the first cross section, a second three-dimensional virtual object having a second cross section with a different normal vector from the first cross section; and an output unit configured to output an image of the second three-dimensional virtual object generated by the image generation unit.

The present invention provides a technique intending to provide a natural cross-sectional operation with respect to a three-dimensional virtual object arranged in a virtual space.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining an operation with respect to a downward cross section in step S8080;

FIG. 14 is a view showing the outer appearance of the system according to the third embodiment;

DESCRIPTION OF THE EMBODIMENTS

Preferred embodiments of the present invention will now be described in detail with reference to the accompanying drawings. Note that the following embodiments are merely examples, and are not intended to limit the scope of the present invention.

First Embodiment

An information processing system including a head-mounted display (HMD) will be exemplified and described as the first embodiment of a display control apparatus according to the present invention.

<Apparatus Arrangement>

Figure 1:
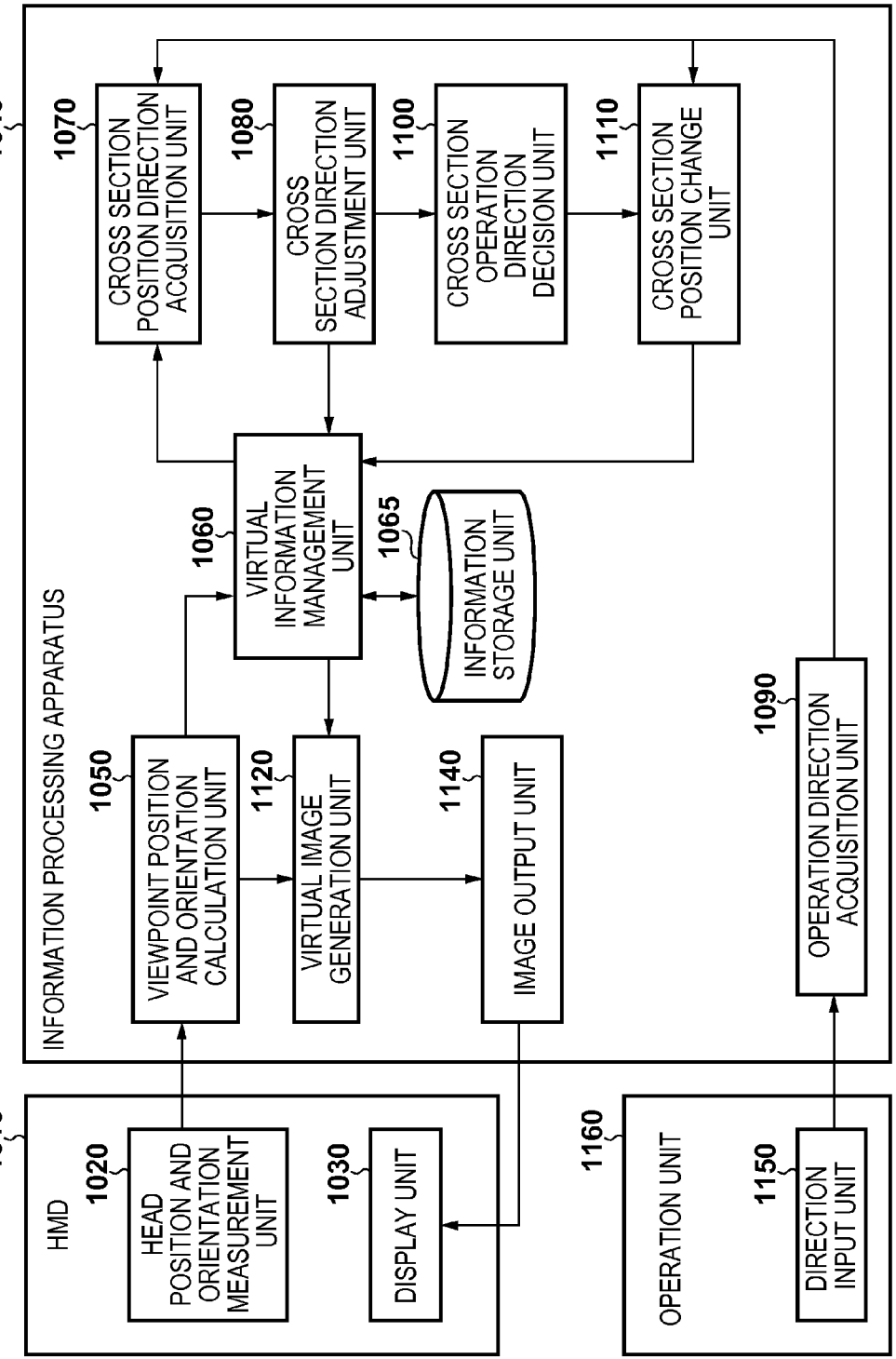
FIG. 1 is a block diagram showing the overall arrangement of a system according to the first embodiment.
Figure 2:
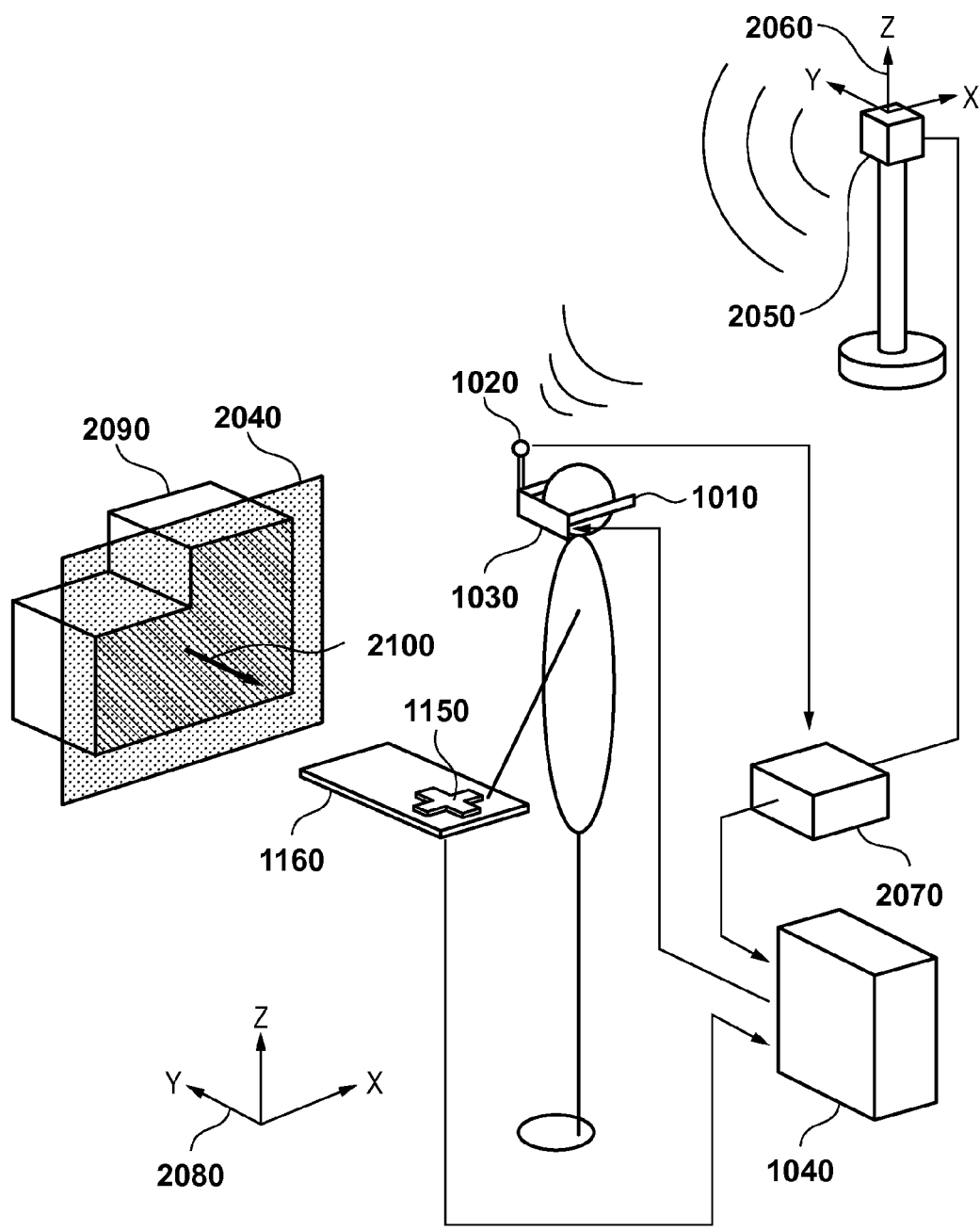
FIG. 2 is a view showing the outer appearance of the system according to the first embodiment.

FIG. 1 is a block diagram showing the overall arrangement of the system according to the first embodiment. FIG. 2 is a view showing the outer appearance of the information processing system according to the first embodiment. As described above, the information processing system uses a head-mounted display (HMD) including a position and orientation measurement unit and a display unit. Note that a magnetic field generator 2050 that generates a magnetic field is arranged at a predetermined position in a physical space. A sensor controller 2070 controls the operation of the magnetic field generator 2050.

A head-mounted display (HMD) 1010 includes a head position and orientation measurement unit 1020 serving as a magnetic sensor, and one display unit 1030. The head position and orientation measurement unit 1020 measures a change of the magnetic field corresponding to the position and orientation (position and direction) of the head position and orientation measurement unit 1020 itself. Then, the head position and orientation measurement unit 1020 sends the measurement result to the sensor controller 2070. The sensor controller 2070 generates a signal value representing the position and orientation of the head position and orientation measurement unit 1020 in a sensor coordinate system 2060 based on the input measurement result, and sends the signal value to an information processing apparatus 1040. The sensor coordinate system 2060 (predetermined coordinate system) is a coordinate system having the position of the magnetic field generator 2050 as an origin, and three axes perpendicular to each other at this origin as the X-, Y-, and Z-axes.

A viewpoint position and orientation calculation unit 1050 of the information processing apparatus 1040 calculates the position and orientation of a viewpoint in a virtual space coordinate system 2080 of the image of a virtual space that is displayed on the display unit 1030. Then, the viewpoint position and orientation calculation unit 1050 updates a virtual information management unit 1060. The virtual space coordinate system 2080 is a coordinate system having, as an origin and X-, and Y-, and Z-axes, the origin and three axes of a coordinate system defining a virtual space where a three-dimensional virtual object is arranged.

Note that a measurement method using a magnetic sensor is employed as a position and orientation measurement method. However, the present invention does not depend on the position and orientation measurement method, so a position and orientation measurement method using a sensor such as an optical sensor or an ultrasonic sensor, other than the magnetic sensor, may be adopted. A method of attaching an image capturing device to the HMD 1010 and estimating the position and orientation of the image capturing device from an image captured by the image capturing device may also be employed. A plurality of position and orientation measurement methods may also be used in combination.

The virtual information management unit 1060 holds the position and orientation of the viewpoint calculated by the viewpoint position and orientation calculation unit 1050. Further, the virtual information management unit 1060 reads out pieces of information of a virtual object 2090 and cross-sectional plane 2040 from an information storage unit 1065. Pieces of position information of the virtual object 2090 and cross-sectional plane 2040 are coordinate values in the virtual space coordinate system 2080.

An observer (operator) who wears the HMD 1010 on his head controls the positions of the virtual object 2090 and cross-sectional plane 2040 in the virtual space via an operation unit 1160 (for example, a game controller) serving as an indicator that is gripped with the hand or the like and operated. The operation unit 1160 includes a direction input unit 1150 configured as a four-way selector key capable of indicating at least two axial directions (up-and-down and left-and-right in this case). The operation unit 1160 determines an input to the direction input unit 1150, and sends the determination result to the information processing apparatus 1040.

An operation direction acquisition unit 1090 acquires the input direction sent by the direction input unit 1150. A cross-sectional position direction acquisition unit 1070 acquires the cross-sectional plane 2040 from the virtual information management unit 1060, and calculates a normal 2100 to the cross-sectional plane 2040.

Figure 3:
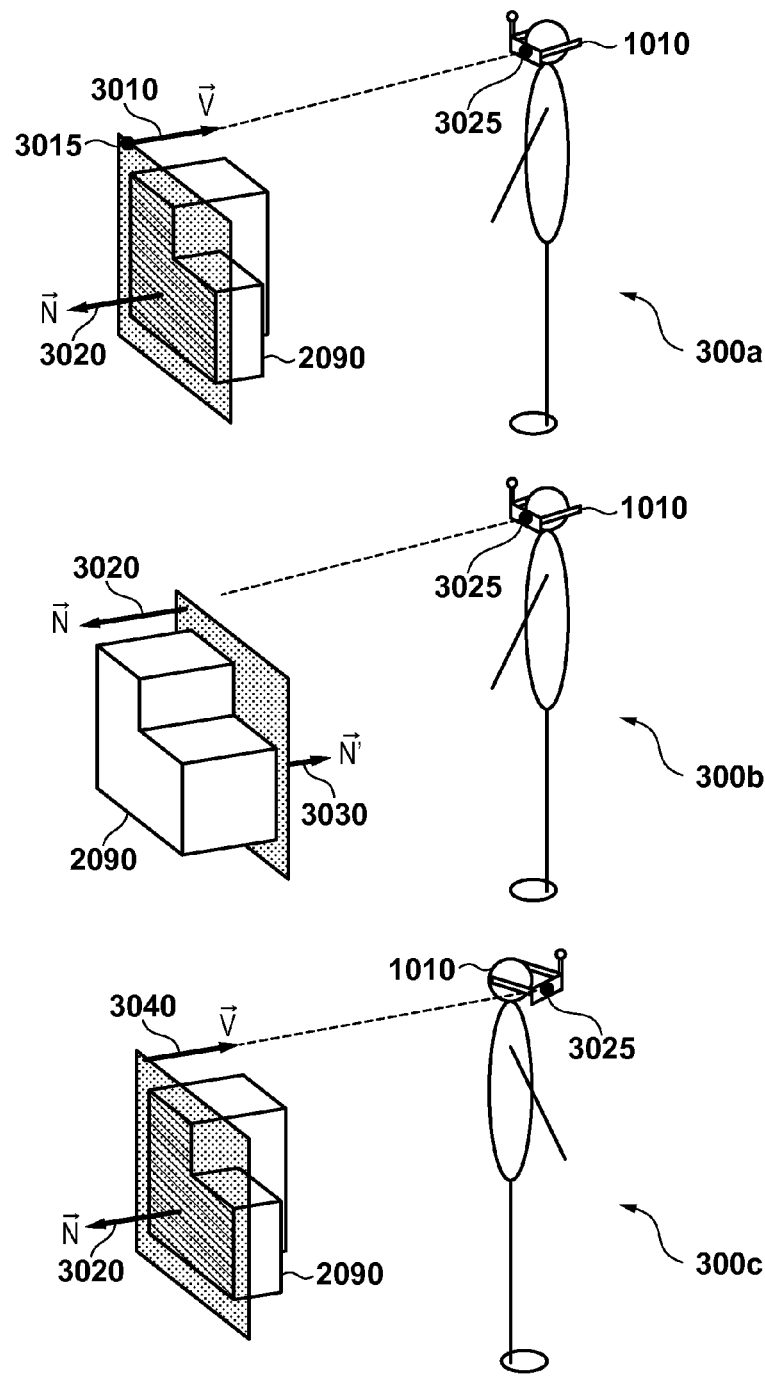
FIG. 3 is a view for explaining the relationship between the viewpoint and the cutting direction (to be referred to as a cross-section normal direction hereinafter) of the cross section of a virtual object.

FIG. 3 is a view for explaining the relationship between the viewpoint and the normal direction (to be referred to as a cross-section normal direction hereinafter because it is a direction along the normal between the observer and the cross-section in question) of the cross section of the virtual object. In a state 300a, a cross-section normal direction 3020 is not turned to an observer's viewpoint 3025 in the virtual space. In a state 300b, a cross-section normal direction 3030 is turned to the viewpoint 3025 in the virtual space. In another state 300c, the cross-section normal direction 3020 is not turned to the viewpoint 3025 in the virtual space.

When the cross-section normal direction 3020 is not turned to the viewpoint 3025, as represented by 300a, a cross-section normal direction adjustment unit 1080 reverses the cross-section normal direction 3020 and changes it so that the cross-section normal direction 3030 is turned to the viewpoint 3025, like the cross-section normal direction 3030 in 300b. The cross-section normal direction adjustment unit 1080 then updates the virtual information management unit 1060.

A cross-sectional operation direction decision unit 1100 decides a cross-sectional operation direction from the position and orientation of the viewpoint calculated by the viewpoint position and orientation calculation unit 1050, and the cross sectional plane 2040 and normal 2100 that are acquired by the cross section position direction acquisition unit 1070. When an input direction acquired by the operation direction acquisition unit 1090 coincides with a cross-sectional operation direction decided by the cross-sectional operation direction decision unit 1100, a cross-sectional position change unit 1110 moves the cross-sectional plane 2040, by a predetermined distance, and updates the virtual information management unit 1060.

A virtual-image generation unit 1120 generates an image of the virtual space viewed from a viewpoint having the position and orientation obtained by the viewpoint position and orientation calculation unit 1050. An image output unit 1140 outputs, to the display unit 1030 of the HMD 1010, the image of the virtual space received from the virtual image generation unit 1120. Accordingly, the image of the virtual space corresponding to the position and orientation of the viewpoint of the observer is presented in front of the eyes of the observer who wears the HMD 1010 on his head.

Figure 9:
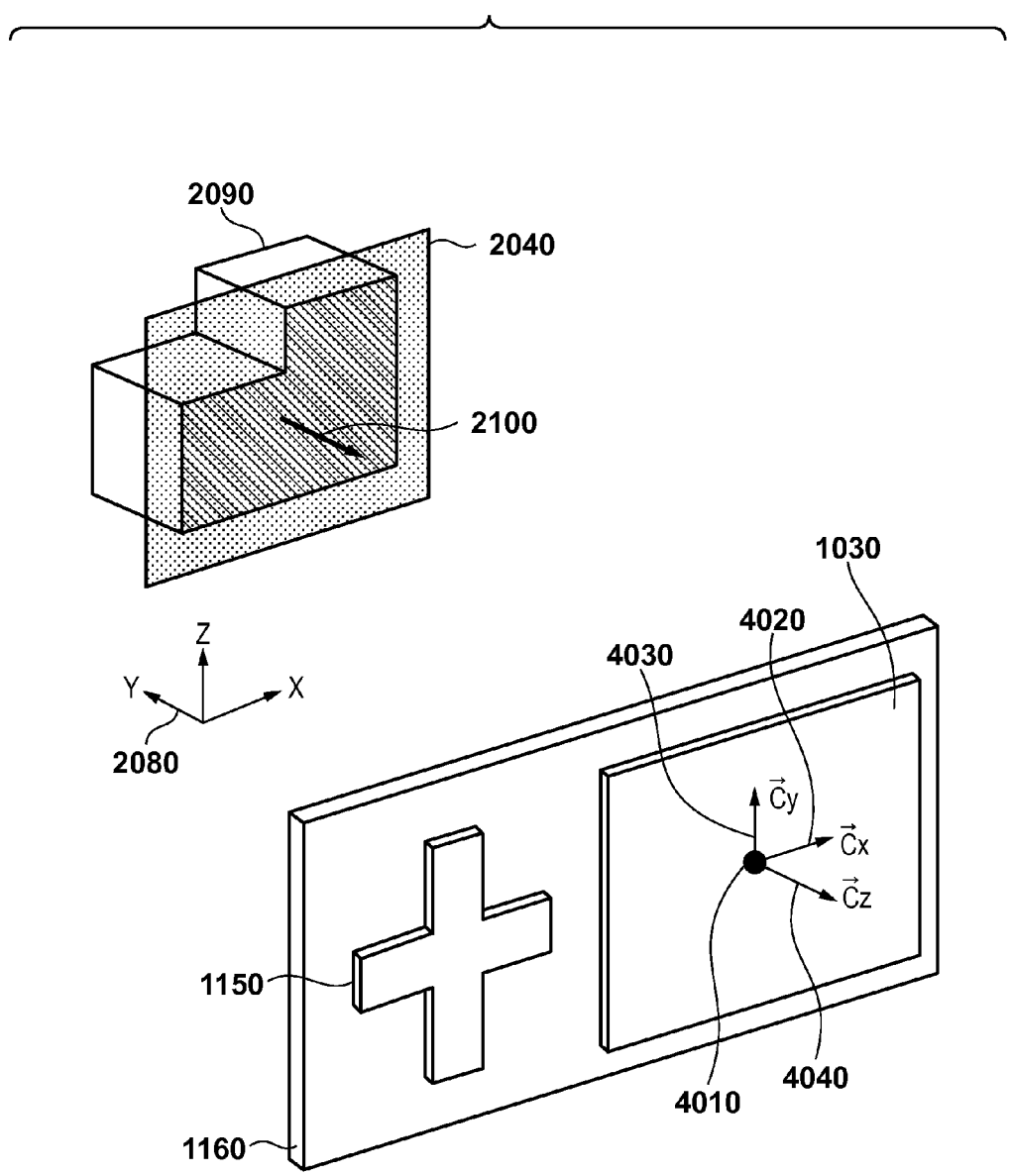
FIG. 9 is a view of an operation device of another form.

FIG. 9 is a view showing an operation device of another form. FIG. 9 shows an operation device of a form in which the observer grips the operation unit 1160 having the display unit 1030, and operates the direction input unit 1150 while viewing the virtual object 2090 and cross-sectional plane 2040 displayed on the display unit.

<Apparatus Operation>

Figure 8:
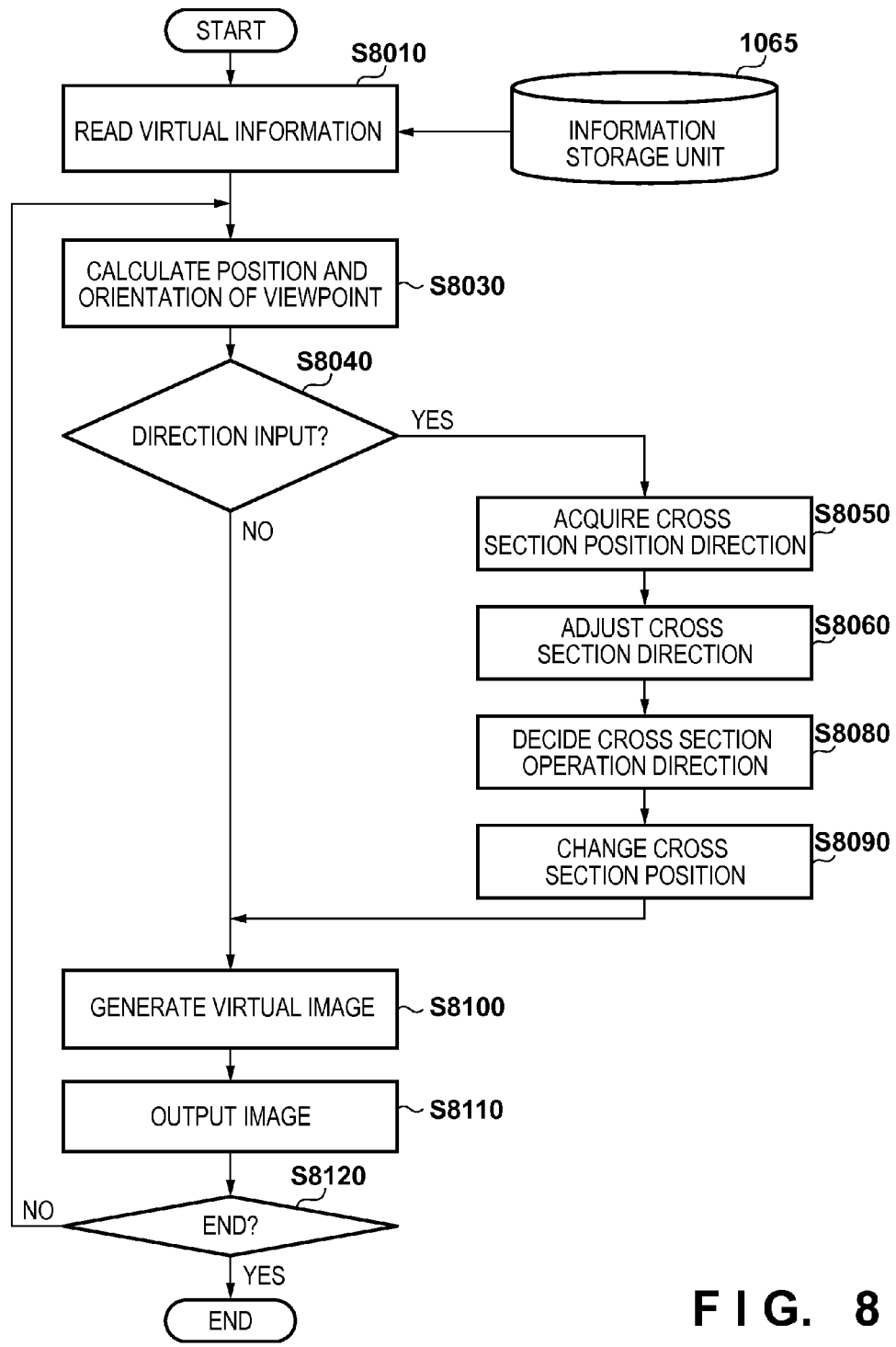
FIG. 8 is a flowchart showing processing to be performed by an information-processing apparatus 1040 according to the first embodiment.

FIG. 8 is a flowchart showing processing to be performed by the information processing apparatus 1040 according to the first embodiment.

In step S8010, the virtual information management unit 1060 reads out pieces of information of the virtual object 2090 and cross-sectional plane 2040 from the information storage unit 1065.

In step S8030, the viewpoint position and orientation calculation unit 1050 calculates the position and orientation (position and line-of-sight direction) of a viewpoint in the sensor coordinate system 2060. Note that the relative positions and orientations of the head position and orientation measurement unit 1020 and the observer's eye serving as the viewpoint are known in advance from the shape of the HMD 1010 and can be easily calculated.

Figure 4:
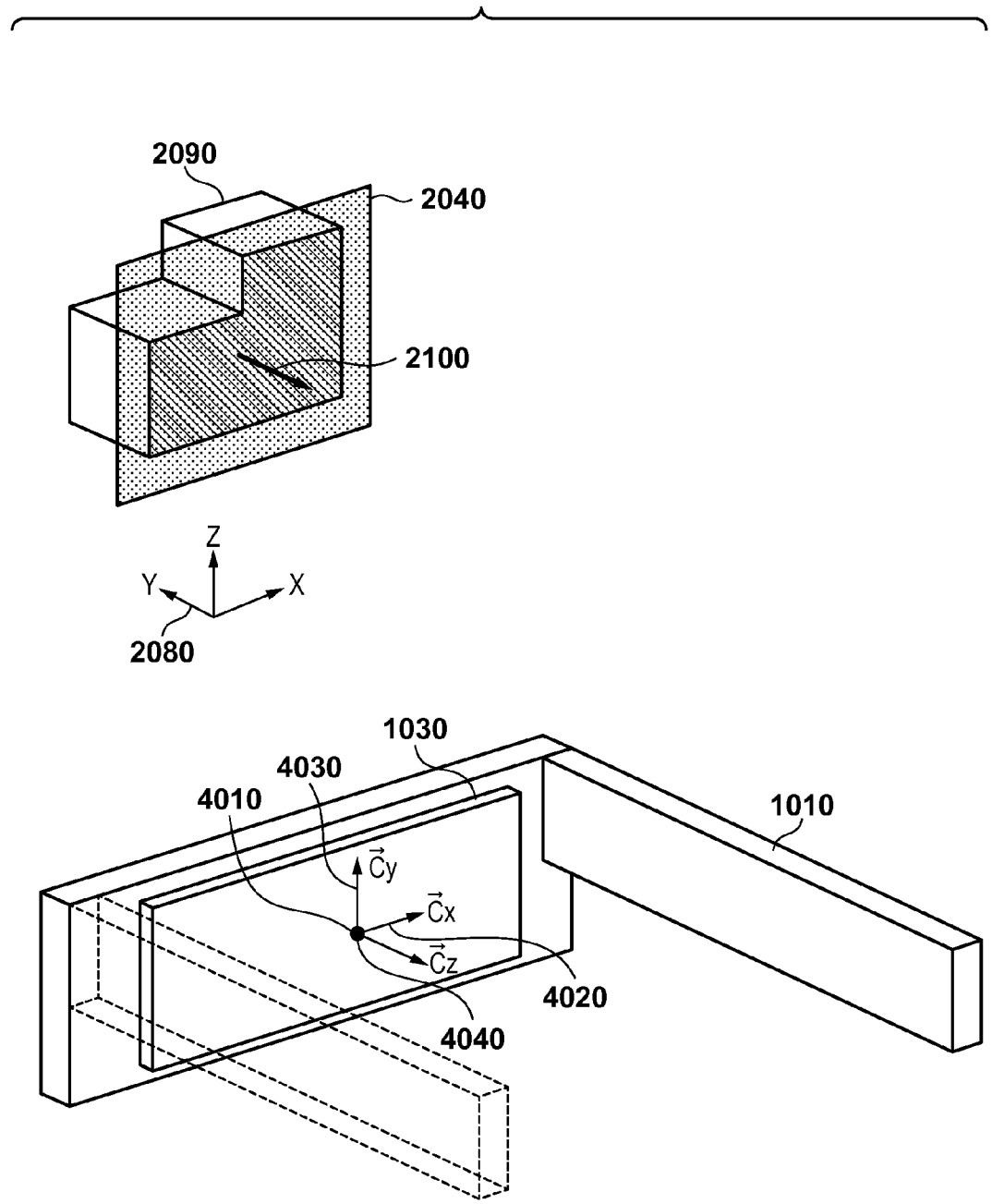
FIG. 4 illustrates an operation in step S8030.

FIG. 4 is a view for explaining the operation in step S8030. Since the relative positions and orientations of the virtual space coordinate system 2080 and sensor coordinate system 2060 are known in advance, the position and orientation of a viewpoint in the sensor coordinate system 2060 is converted into a coordinate value in the virtual space coordinate system. Then, as shown in FIG. 4, a viewpoint position 4010, and three axes perpendicular to each other at this point, that is, a Cx axis 4020 perpendicular to the visual axis in the horizontal direction, a Cy axis 4030 perpendicular to the visual axis in the vertical direction, and a Cz axis 4040 along the visual axis are obtained.

If it is determined in step S8040 that the operation direction acquisition unit 1090 has received an input from the direction input unit 1150, the process advances to step S8050. If it is determined that the operation direction acquisition unit 1090 has not received an input, the process advances to step S8100.

In step S8050, the cross-sectional position direction acquisition unit 1070 acquires the position and orientation of a currently set cross-sectional plane from the virtual information management unit 1060, and calculates the normal vector of the cross-sectional plane. The normal vector can be obtained by calculating two vectors from three arbitrary successive vertices of the cross-sectional plane, and deriving the outer product of the two vectors. The normal vector of the cross-sectional plane may be saved in advance in the information storage unit 1065.

In step S8060, as represented by 300*a* in FIG. 3, the cross-section normal direction adjustment unit 1080 obtains a viewpoint direction unit vector 3010 from a vector having, as a start point, one arbitrary point 3015 on the cross section and, as an end point, the viewpoint 3025 calculated by the viewpoint position and orientation calculation unit 1050. Further, the cross-section normal direction adjustment unit 1080 obtains the normal direction unit vector 3020 of the cross-sectional plane calculated by the cross section position direction acquisition unit 1070. Then, the cross-section normal direction adjustment unit 1080 calculates the scalar product of the viewpoint direction unit vector 3010 and the normal direction unit vector 3020 of the cross-sectional plane.

A negative scalar product represents that the cross-section normal direction 3020 serving as the cutting direction of the cross section of the virtual object is not turned to the line-of-sight direction. The cross-section normal direction 3020 is therefore reversed so that the observer can observe the cross section from the viewpoint position. More specifically, the cutting direction of the cross section of the virtual object is changed so that it is turned to the viewpoint 3025, like the cross-section normal direction 3030 in 300*b*. When the scalar product is 0 or positive, the cross section is turned to the line-of-sight direction, and nothing is done.

When the cutting direction of the cross section of the virtual object is not turned to the line-of-sight direction, as in 300*c*, even if the cross-section normal direction 3020 is reversed and turned to the viewpoint 3025, the line-of-sight direction is not turned to the cutting direction of the cross section. For this reason, neither the virtual object nor the cross section of the virtual object is displayed on the HMD 1010. However, the HMD 1010 is mounted on the head and the position and orientation of the viewpoint always can be changed. Since the observer is highly likely to take an orientation in which the line-of-sight direction 3040 is turned to the virtual object and the cross section, it is preferable to reverse in advance the cutting direction of the cross section even in the case as represented by 300*c*.

In step S8080, the cross-sectional operation direction decision unit 1100 calculates an angle α formed by a direction perpendicular to the line of sight of the observer which, when standing in a normal way, is an "up" direction with respect to the observer; and the normal direction of the cross section. At this time, the scalar product of the up-with-respect-to-the-line-of-sight direction unit vector 4030 obtained from the position and orientation of the viewpoint calculated by the viewpoint position and orientation calculation unit 1050, and the cross section normal unit vector 2100 calculated by the cross-sectional position direction acquisition unit 1070 is obtained, as shown in FIG. 4. According to known mathematical relationships, the scalar product of the unit vectors is the cosine value of an angle formed by these two vectors, so the formed angle α can be obtained from the cosine value.

Figure 5:
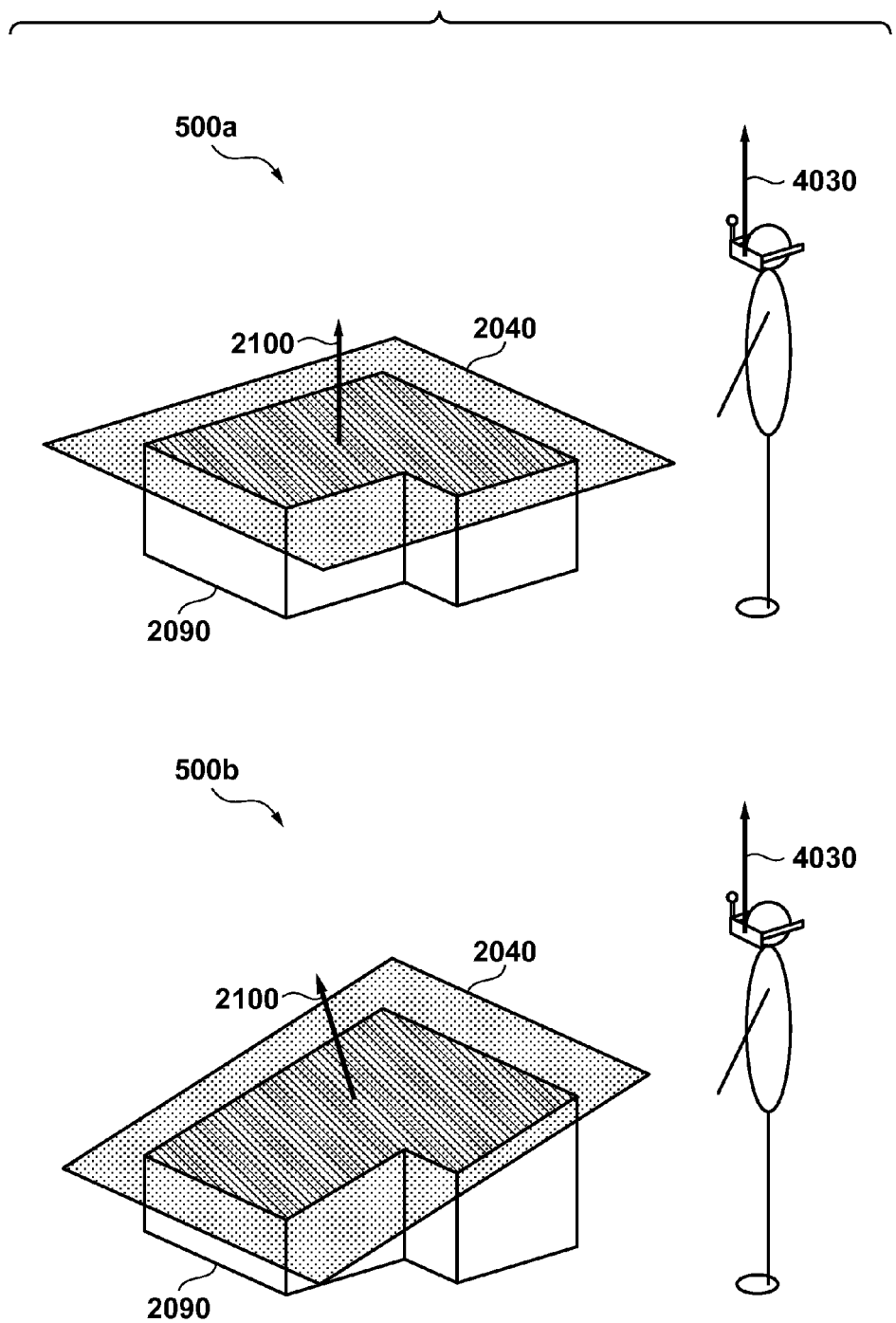
FIG. 5 is a view for explaining an operation with respect to an upward cross section in step S8080.

FIG. 5 is a view for explaining an operation with respect to a cross section turned to the up direction in step S8080. When the cross-sectional plane is turned to the up direction 4030 with respect to the line of sight, as represented by 500*a* and 500*b*, the direction of the cross section's normal unit vector 2100 is associated with an "up" input to the direction input unit 1150. Also, a direction opposite to the cross section's normal unit vector 2100 is associated with a "down" (that is, a direction opposite to "up") input to the direction input unit 1150. When the angle α falls within a predetermined angle range ($0° \leq α < (90-A)°$, where $0 < A < 90$, for example, $0°\le\alpha\le 45°$ when A is 45°), it is determined that the cross-sectional plane is turned to the up direction of the line of sight.

FIG. 6 is a view for explaining an operation with respect to a cross section turned to the down direction in step S8080. When the cross-sectional plane is turned to the down direction of the line of sight, as represented by 600a and 600b, the direction of the cross section's normal unit vector 2100 is associated with a "down" input to the direction input unit 1150. Thus, a direction opposite to the cross section's normal unit vector 2100 is associated with an "up" input to the direction input unit 1150. When the angle $\alpha$ falls within a predetermined angle range $((90+A)°<\alpha\le 180°$, for example, $135°\le\alpha\le 180°$ when A is 45°), it is determined that the cross-sectional plane is turned to the down direction with respect to the viewpoint.

Figure 7:
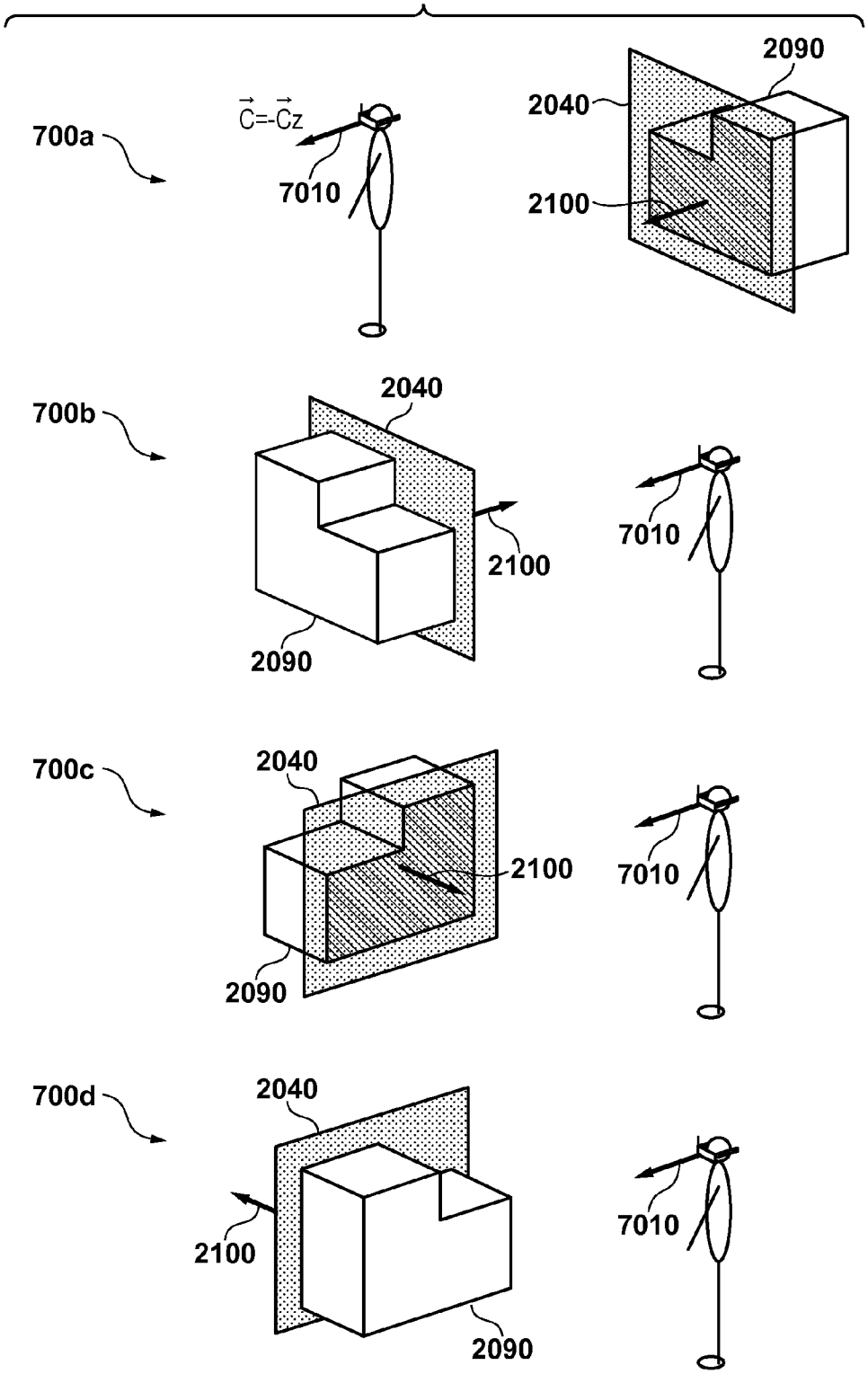
FIG. 7 is a view for explaining an operation with respect to a lateral cross section in step S8080.

FIG. 7 is a view for explaining an operation with respect to a cross section turned to a lateral direction (or sideways direction with respect to the direction of gaze of the observer) in step S8080. When the cross-sectional plane is turned to the lateral direction with respect to the line of sight, as represented by 700a to 700d, a formed angle $\beta$ is obtained from the scalar (or inner) product of a line-of-sight direction unit vector 7010 and the cross section's normal unit vector 2100. When the angle $\beta$ falls within a predetermined angle range $((90-B)°\le\beta<(90+B)°$, where $0<B<90$, for example, $45°<\beta<135°$ when B is 45°), it is determined that the cross-sectional plane is turned in a lateral direction with respect to the line of sight. The line-of-sight direction 7010 is a direction (−Cz) opposite to the visual axis direction vector 4040 (Cz) of the viewpoint in FIG. 4 obtained from the position and orientation of the viewpoint calculated by the viewpoint position and orientation calculation unit 1050.

When the cross-section normal direction and the line-of-sight direction are turned to the same direction, as represented by 700a, the direction of the cross section's normal unit vector 2100 is associated with a "forward" input to the direction input unit 1150. Then, a direction opposite to the cross section normal unit vector 2100 is associated with a "backward" input to the direction input unit 1150. When the angle $\beta$ falls within a predetermined angle range $(0°\le\beta<(90-B)°$, where $0<B<90$, for example, $0°\le\beta<45°$ when B is 45°), it is determined that the cross-sectional plane and the line-of-sight direction are in the same direction.

When the cross-section normal direction and the line-of-sight direction are turned to opposite directions (i.e. when they face each other), as represented by 700b, the direction of the cross section's normal unit vector 2100 is associated with a "backward" input to the direction input unit 1150. In addition, a direction opposite to the cross section normal unit vector 2100 is associated with a "forward" input to the direction input unit 1150. When the angle $\beta$ falls within a predetermined angle range $((90+B)°<\beta\le 180°$, for example, $135°<\beta\le 180°$ when B is 45°), it is determined that the cross-sectional plane and the line-of-sight direction are in opposite directions.

When the cross-sectional plane is turned to the left or right direction with respect to the line-of-sight direction when viewed from the observer, as represented by 700c or 700d, the outer product of the x and y components of the line-of-sight direction unit vector 7010 and the x and y components of the cross section normal unit vector 2100 is calculated. In this case, when the angle $\beta$ falls within a predetermined angle range (for example, $45°\le\beta\le 135°$), it is determined that the cross-sectional plane is turned to the "left" or "right" direction with respect to the line-of-sight direction when viewed from the observer. If the sign of the outer (or tensor) product is negative, it can be determined that the cross section is turned to the "right" with respect to the line-of-sight direction. If the sign is positive, it can be determined that the cross section is turned to the "left" with respect to the line-of-sight direction.

When the cross section is turned to the right with respect to the line-of-sight direction, the direction of the cross section's normal unit vector 2100 is associated with a "right" input to the direction input unit 1150. In addition, a direction opposite to the cross section's normal unit vector 2100 is associated with a "left" input to the direction input unit 1150. In contrast, when the cross section is turned to the left direction with respect to the line-of-sight direction, the direction of the cross section normal unit vector 2100 is associated with a "left" input to the direction input unit 1150. Also, a direction opposite to the cross section normal unit vector 2100 is associated with a "right" input to the direction input unit 1150.

In step S8090, if the input direction acquired by the operation direction acquisition unit 1090 coincides with the cross-sectional operation direction decided by the cross-sectional operation direction decision unit 1100, the cross-sectional position change unit 1110 moves the cross-sectional plane 2040, by a predetermined distance, and updates information managed in the virtual information management unit 1060.

In step S8100, the virtual image generation unit 1120 generates an image of the virtual space viewed from the position and orientation of the viewpoint obtained by the viewpoint position and orientation calculation unit 1050. In step S8110, the image output unit 1140 outputs, to the display unit 1030 of the HMD 1010, the image of the virtual space received from the virtual image generation unit 1120.

If it is determined in step S8120 that an end request has been received from the observer, the process ends. If it is determined that no end request has been received, the process returns to step S8030 and is repeated.

As described above, according to the first embodiment, the cross-section normal direction is controlled based on the relationship between the viewpoint position of an observer (operator) and a cross-section normal direction to which the cross section of a virtual object is turned. In addition, it is controlled to change the association between an input to the direction input unit and the operation direction, based on the relationship between the line-of-sight direction of the observer (operator) and the cross-section normal direction to which the cross section of the virtual object is turned. Hence, the first embodiment can implement a natural cross-sectional operation with respect to a three-dimensional virtual object arranged in a virtual space.

Second Embodiment

Figure 10:
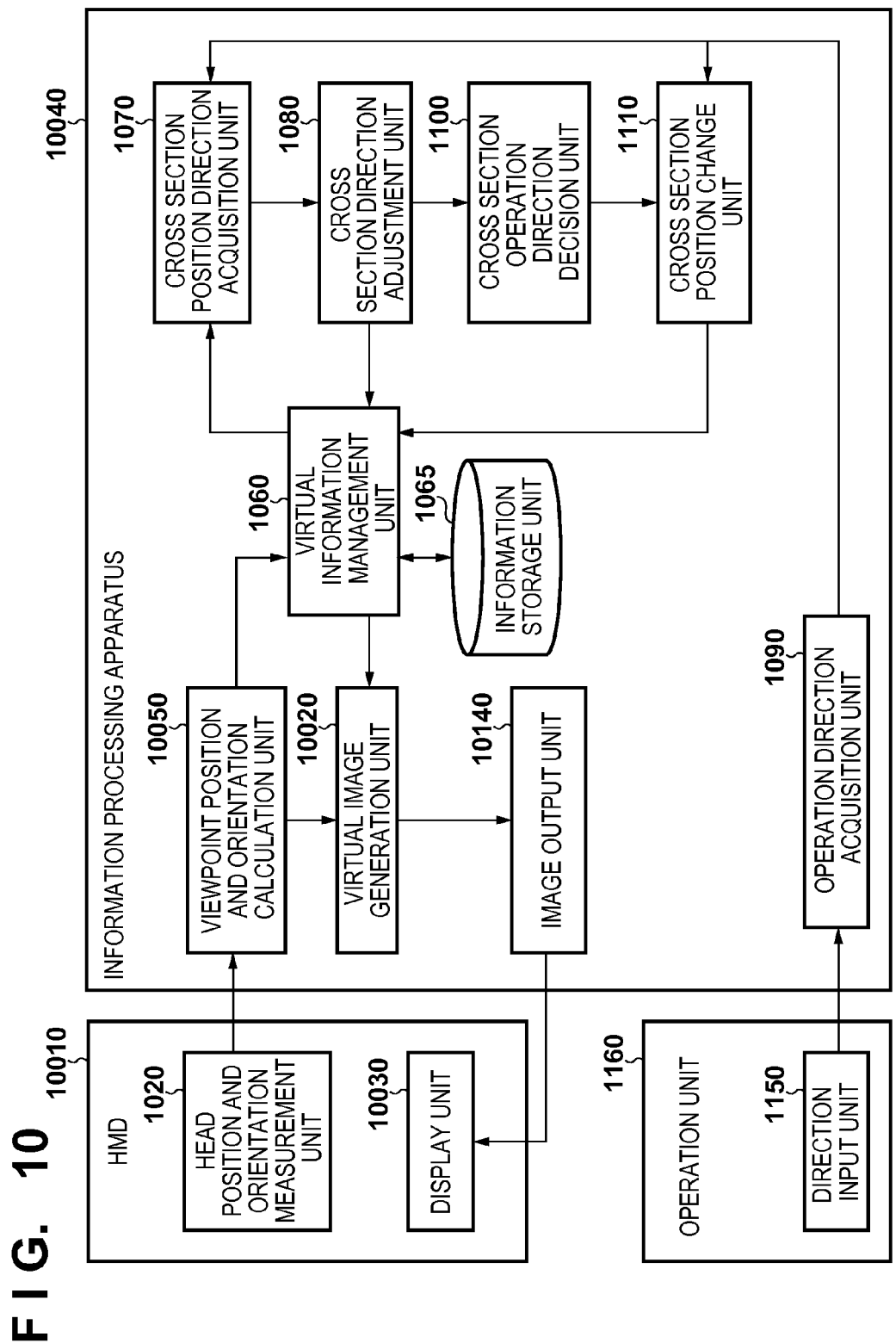
FIG. 10 is a block diagram showing the overall arrangement of a system according to the second embodiment.

The second embodiment will describe a form in which a head-mounted display includes two display units as shown in FIG. 10. More specifically, an HMD 10010 includes two display units 10030 for the right and left eyes so as to provide a three-dimensional (3D) display to an observer.

<Apparatus Arrangement>

Figure 11:
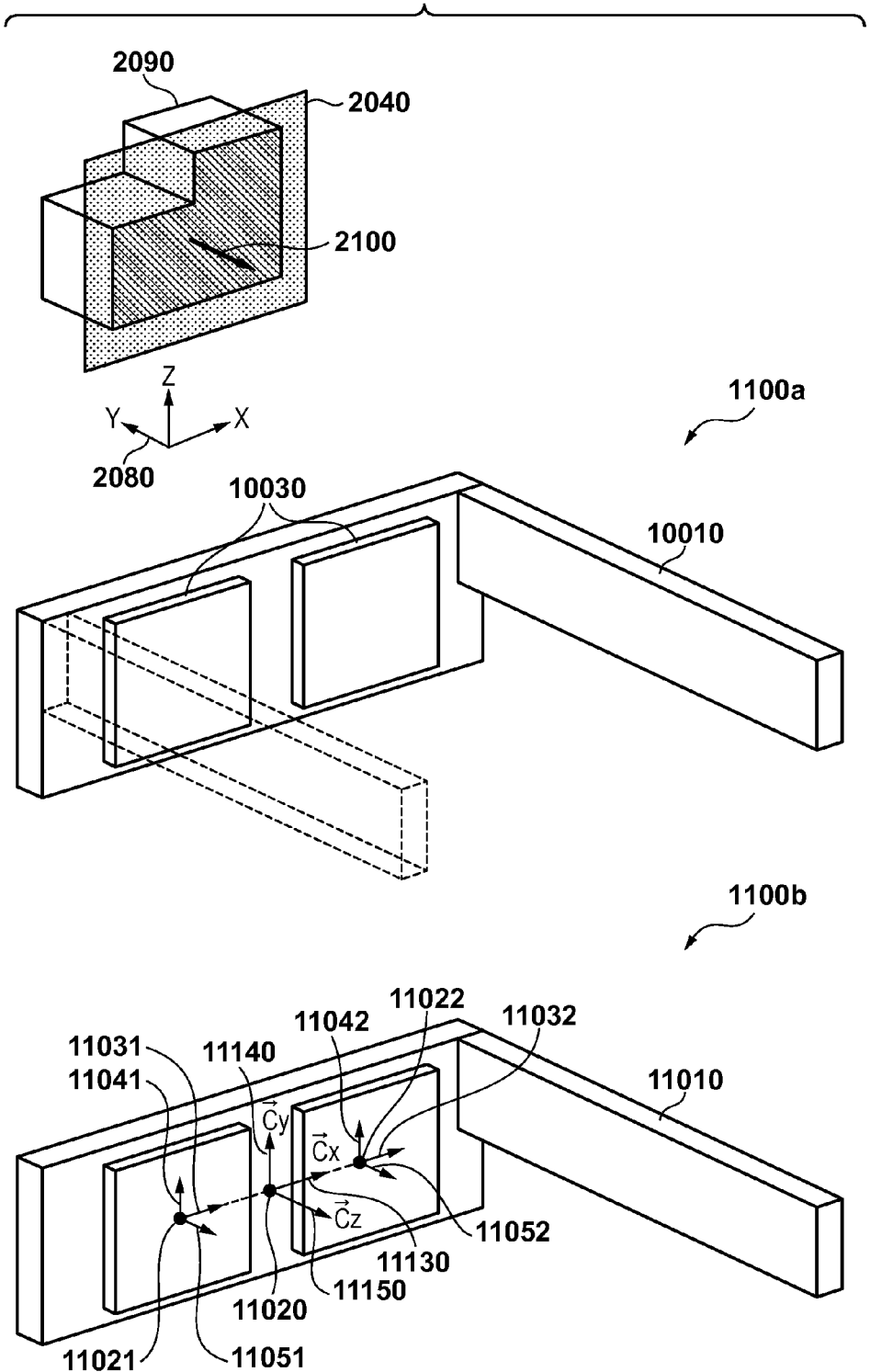
FIG. 11 is a view of the outer appearance of a head-mounted display (HMD) according to the second embodiment.

FIG. 10 is a block diagram showing the overall arrangement of a system according to the second embodiment. FIG. 11 is a view showing the outer appearance of the head-mounted display (HMD) according to the second embodiment. In FIGS. 10 and 11, the same reference numerals as those in FIGS. 1 and 2 denote the same parts, and a description thereof will not be repeated.

The head-mounted display (HMD) 10010 includes the display units 10030 for presenting images to the respective right and left eyes of an observer who wears the HMD 10010 on his head, as represented by the view 1100*a*. The observer who wears the HMD 10010 on his head observes the left-eye display unit 10030 (left side) with his left eye, and the right-eye display unit 10030 (right side) with his right eye. The display units 10030 display images of a virtual space sent from an information processing apparatus 10040. As a result, the three-dimensional image of the virtual space corresponding to the position and orientation of the left and right viewpoints of the observer is presented in front of the eyes of the observer who wears the HMD 10010 on his head. Note that the HMD 10010 may include three or more display units, and adopt an arrangement that presents virtual space images corresponding to the positions and orientations of the viewpoints of the respective display units.

A viewpoint position and orientation calculation unit 10050 of the information processing apparatus 10040 calculates the positions and orientations (e.g. positions and line-of-sight directions) of the right and left eyes in a virtual space coordinate system 2080 of the image of a virtual space. Note that the relative positions and orientations of a head position and orientation measurement unit 1020 and the observer's eye serving as the viewpoint are known in advance from the shape of the HMD 10010 and can be easily calculated. Note that it may be configured to calculate one position and orientation that typifies two positions and orientations, and update a virtual information management unit 1060.

A virtual image generation unit 10020 generates images of the virtual space corresponding to the positions and orientations of the left and right viewpoints of the display units 10030. An image output unit 10140 outputs the images corresponding to the left and right display units 10030.

<Apparatus Operation>

Figure 12:
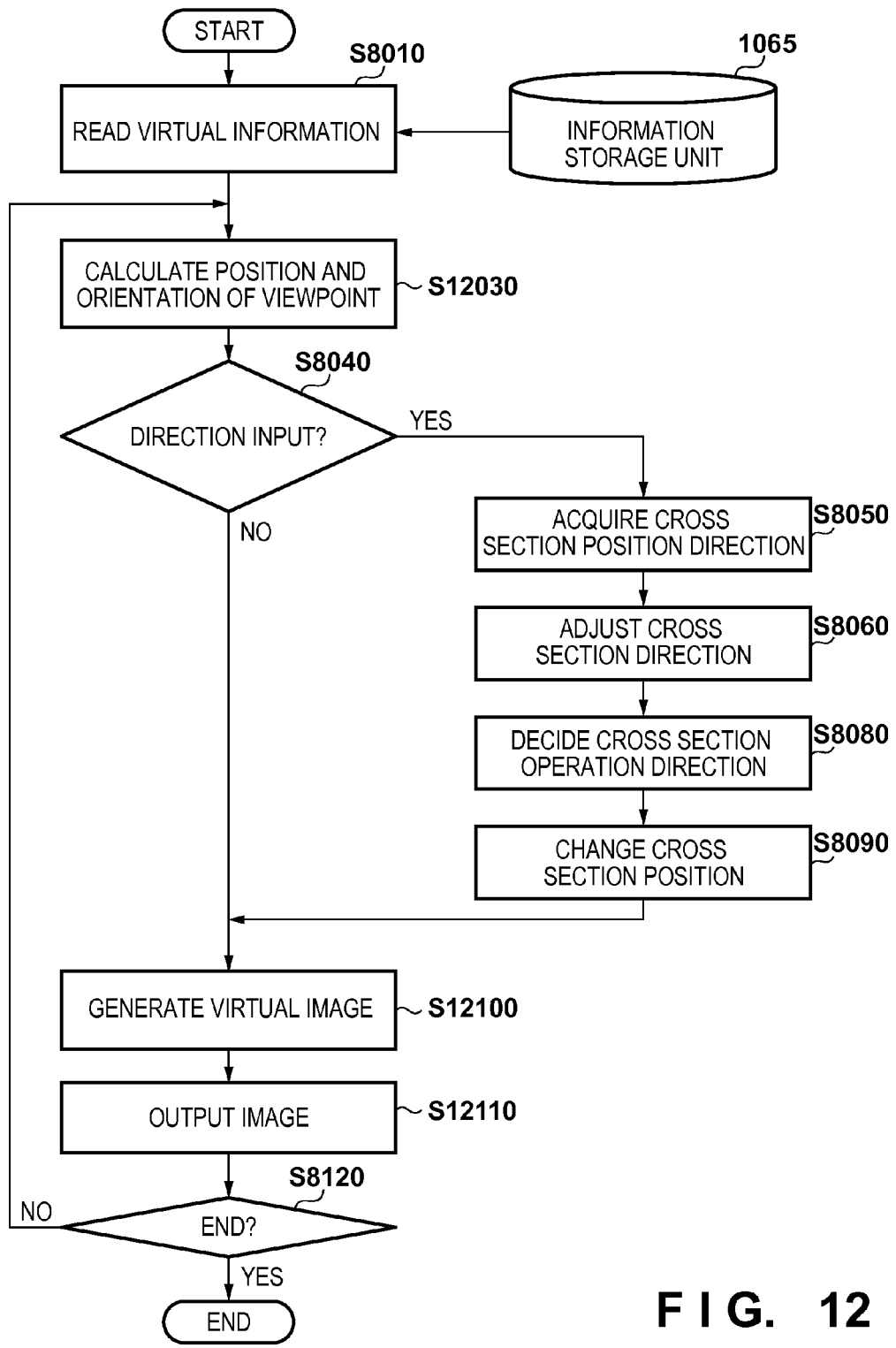
FIG. 12 is a flowchart showing processing to be performed by an information-processing apparatus 10040 according to the second embodiment.

FIG. 12 is a flowchart showing processing to be performed by the information processing apparatus 10040 according to the second embodiment. In the flowchart shown in FIG. 12, the same reference numerals as those in FIG. 8 denote the same processes, and a description thereof will not be repeated.

In step S12030, the viewpoint position and orientation calculation unit 10050 (see FIG. 10) calculates the typical position and orientation (position and line-of-sight direction) of a viewpoint. As in step S8030, a left viewpoint position 11021 of the display unit 10030, and three axes perpendicular to each other at this point, that is, a Cx axis 11031 perpendicular to the visual axis in the horizontal direction, a Cy axis 11041 perpendicular to the visual axis in the vertical direction, and a Cz axis 11051 along the visual axis are obtained, as represented by 1100*b* of FIG. 11. Further, a right viewpoint position 11022 of the display unit 10030, and three axes perpendicular to each other at this point, that is, a Cx axis 11032 perpendicular to the visual axis in the horizontal direction, a Cy axis 11042 perpendicular to the visual axis in the vertical direction, and a Cz axis 11052 along the visual axis are obtained. Then, one typical position and orientation is calculated from the positions and orientations of the respective left and right viewpoints.

First, the middle point of a straight line connecting the positions 11021 and 11022 is obtained and set as a typical position 11020. The sum of the vectors of the Cy axes 11041 and 11042 is calculated to obtain a unit vector and set it as a typical orientation Cy axis 11140. Then, the sum of the vectors of the Cz axes 11051 and 11052 is calculated to obtain a unit vector and set it as a typical orientation Cz axis 11150. Further, the outer product of the Cy axis 11140 and Cz axis 11150 is calculated to obtain a typical orientation Cx axis 11130 perpendicular to the Cy axis 11140 and the Cz axis 11150.

In the HMD 10010 including three or more display units, the barycenter of the viewpoint position of each display unit is set as the typical position. The sums of the vectors for the respective typical orientation axes Cy and Cz are calculated to obtain unit vectors.

In step S12100, the virtual image generation unit 10020 generates images of the virtual space viewed from the positions and orientations of the left and right viewpoints of the display units 10030. In step S12110, the image output unit 10140 outputs, to the left and right display units 10030 of the HMD 10010, the images of the virtual space at the left and right viewpoints of the display units 10030 that have been received from the virtual image generation unit 10020.

As described above, according to the second embodiment, a three-dimensional virtual object arranged in a virtual space can be presented to an observer (operator) by a three-dimensional (3D) display. As in the first embodiment, the second embodiment can implement a natural cross-sectional operation with respect to the three-dimensional virtual object arranged in the virtual space.

Third Embodiment

Figure 13:
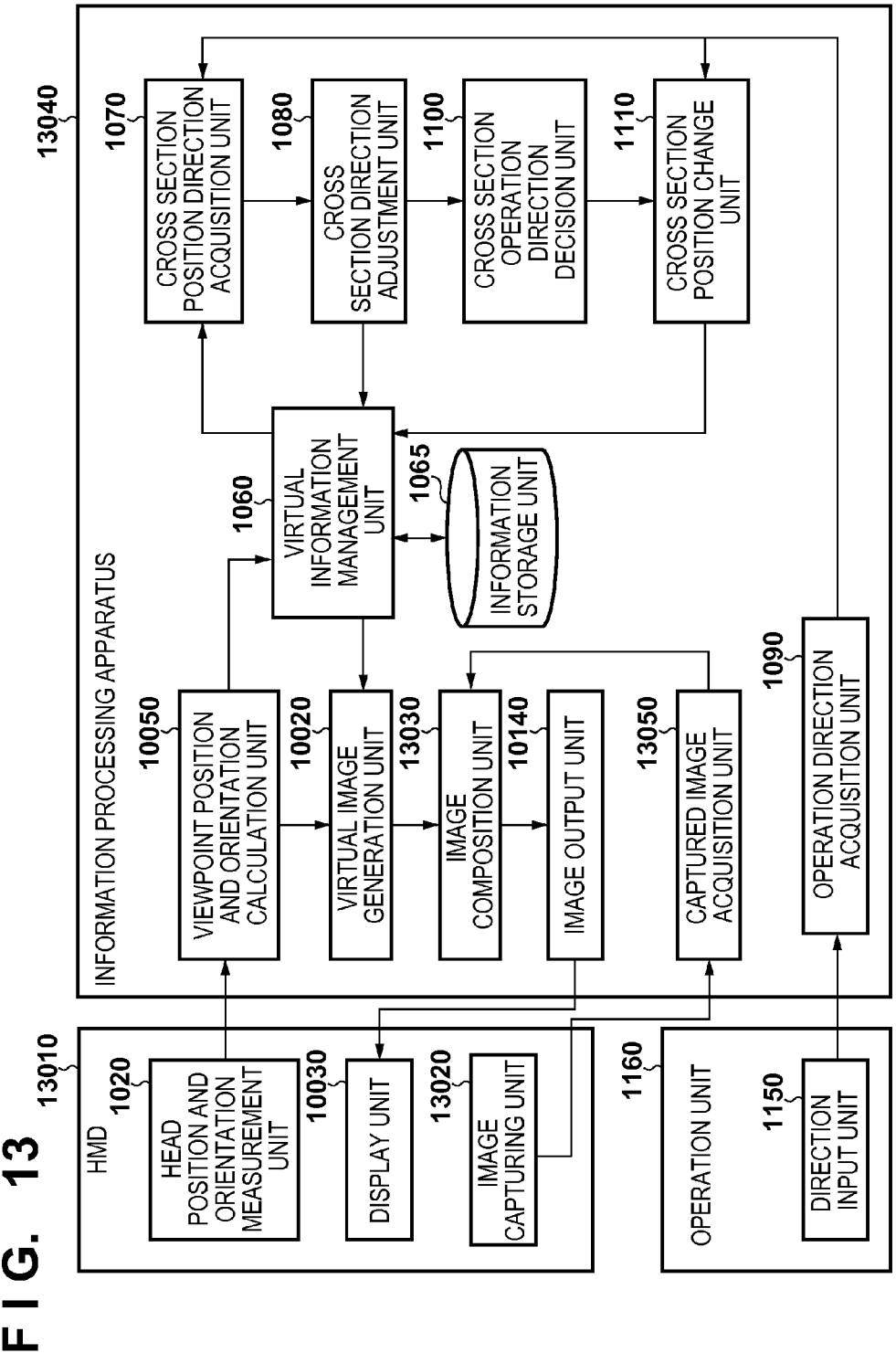
FIG. 13 is a block diagram showing the overall arrangement of a system according to the third embodiment.

The third embodiment will describe a form in which a head-mounted display further includes two image capturing units arranged at the positions of the right and left eyes as shown in FIGS. 13 and 14. More specifically, an HMD 13010 includes image capturing units 13020 so as to provide an observer with a mixed reality (MR) display in which the image of a three-dimensional virtual object arranged in a virtual space is superimposed and displayed on the scene of a physical space.

<Apparatus Arrangement>

FIG. 13 is a block diagram showing the overall arrangement of a system according to the third embodiment. FIG. 14 is a view showing the outer appearance of the system according to the third embodiment. In FIGS. 13 and 14, the same reference numerals as those in FIGS. 2, 10, and 11 denote the same parts, and a description thereof will not be repeated.

The head-mounted display (HMD) 13010 is configured by further adding the two image capturing units 13020 to the HMD 10010. The image capturing units 13020 capture moving images of the physical space, and sequentially input the captured images (images of the physical space) to a captured image acquisition unit 13050 of an information processing apparatus 13040. The two image capturing units 13020 are arranged for the right and left eyes of an observer who wears the HMD 13010 on his head. The image of the physical space captured by the right-eye image capturing unit 13020 is displayed on a right-eye display unit 10030, and the image of the physical space captured by the left-eye image capturing unit 13020 is displayed on a left-eye display unit 10030.

The captured image acquisition unit 13050 sends the acquired images of the physical space to an image composition unit 13030. The image composition unit 13030 generates composite images by superimposing images of a virtual space generated by a virtual image generation unit 10020, and the images of the physical space acquired from the captured image acquisition unit 13050. At this time, two composite images are created for the right and left eyes. The image composition unit 13030 outputs the generated composite images to an image output unit 10140, and the image output unit 10140 outputs the composite images to the display units 10030.

<Apparatus Operation>

Figure 15:
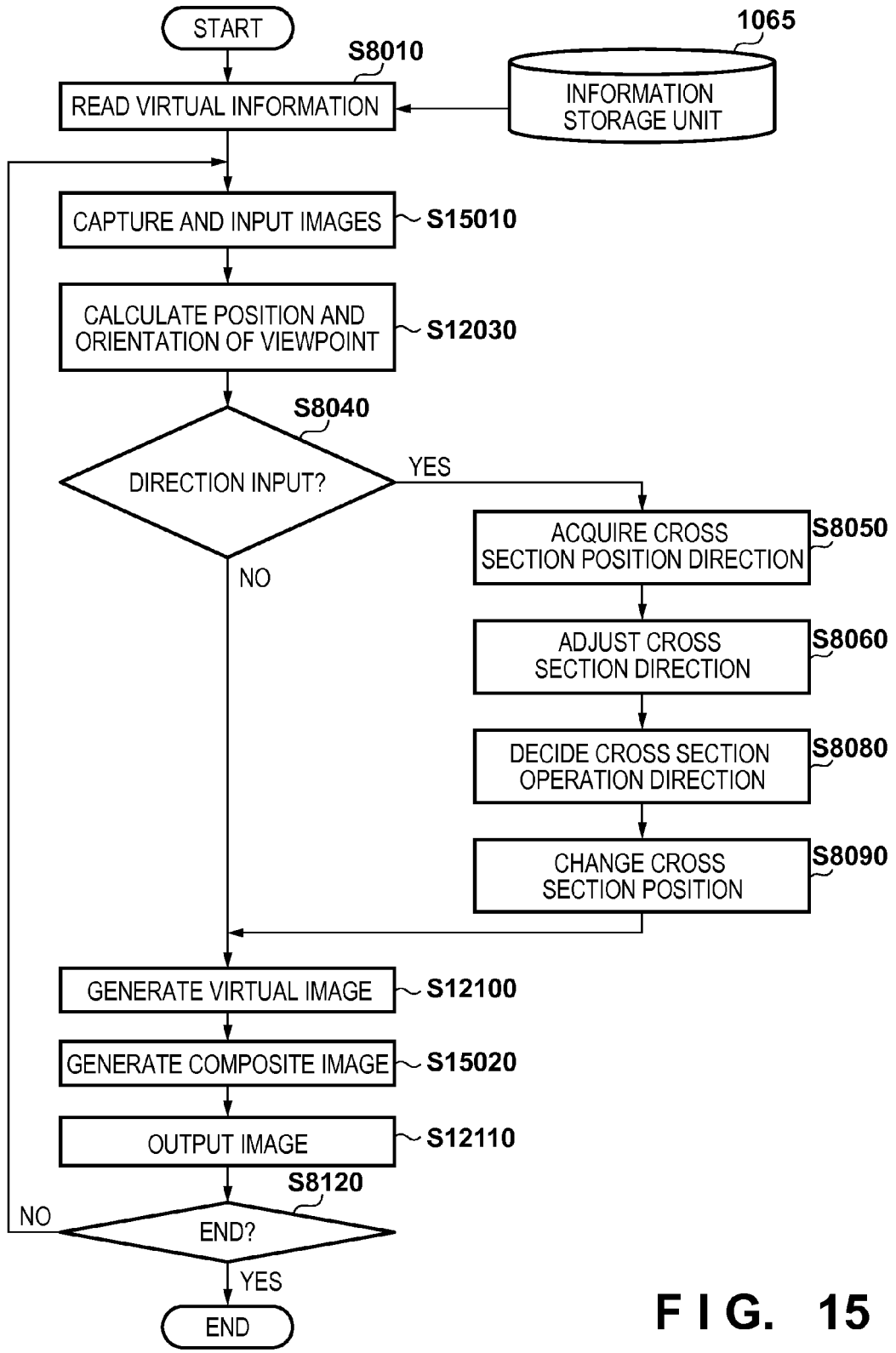
FIG. 15 is a flowchart showing processing to be performed by an information processing apparatus 13040 according to the third embodiment.

FIG. 15 is a flowchart showing processing to be performed by the information processing apparatus 13040 according to the third embodiment. In the flowchart shown in FIG. 15, the same reference numerals as those in FIG. 12 denote the same processes, and a description thereof will not be repeated.

In step S15010, the captured image acquisition unit 13050 sends acquired images of the physical space to the image composition unit 13030. In step S15020, the image composition unit 13030 generates composite images of images of the virtual space generated by the virtual image generation unit 10020, and the images of the physical space acquired from the captured image acquisition unit 13050. The image composition unit 13030 outputs the generated composite images to the image output unit 10140, and the image output unit 10140 outputs the composite images to the display units 10030.

As described above, the third embodiment can provide an observer (operator) with a mixed reality (MR) display in which the image of a three-dimensional virtual object arranged in a virtual space is superimposed and displayed on the scene of a physical space. As in the first embodiment, the third embodiment can implement a natural cross-sectional operation with respect to the three-dimensional virtual object arranged in the virtual space.

Fourth Embodiment

The fourth embodiment will describe a form in which an operation unit (indicator) is used to perform an operation based on a change of the position and orientation of the operation unit itself. In particular, the operation unit includes a magnetic sensor similar to a head position and orientation measurement unit 1020 of the first embodiment, and is configured to be able to measure the position and orientation of the operation unit.

<Apparatus Arrangement>

Figure 16:
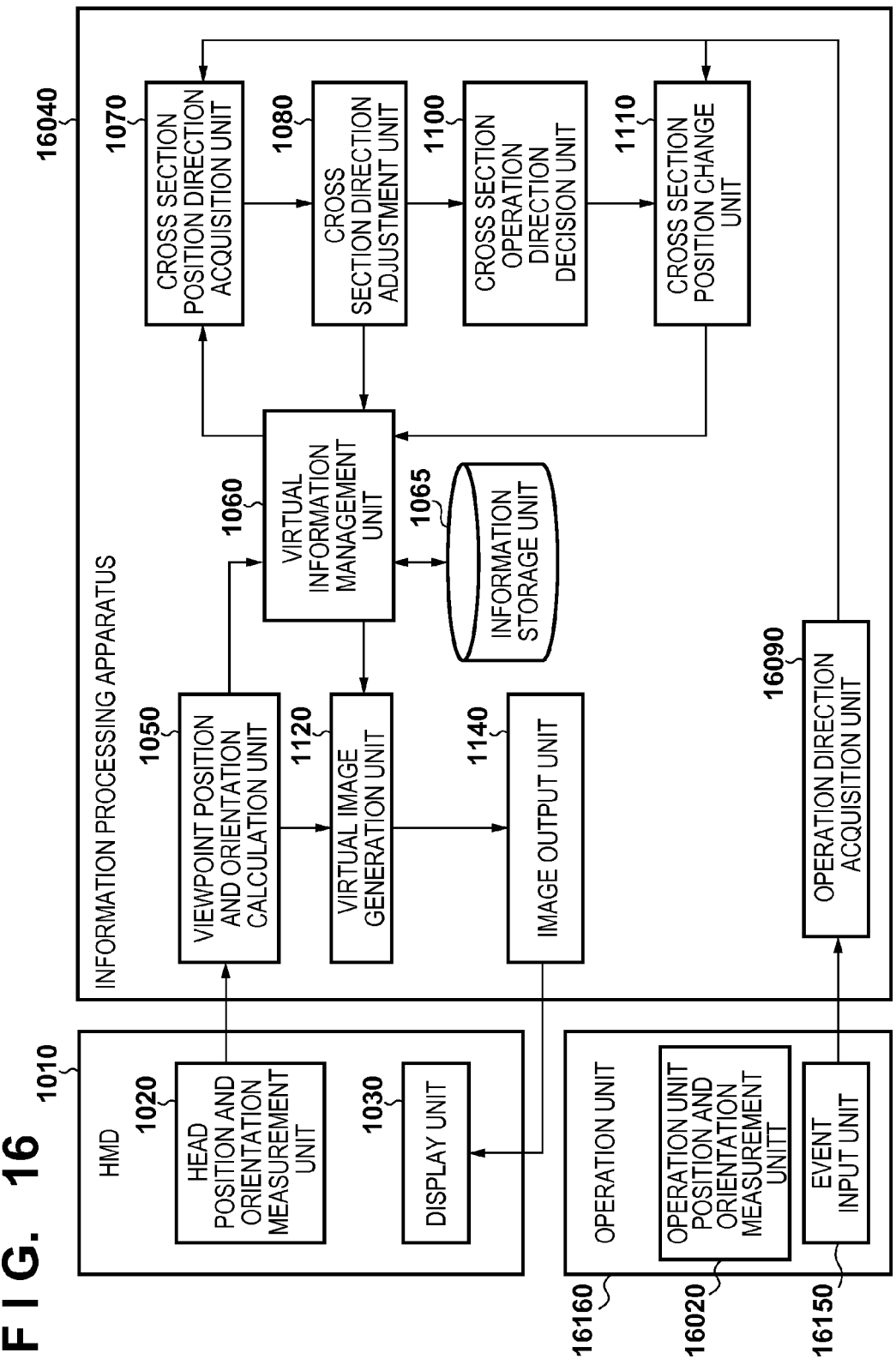
FIG. 16 is a block diagram showing the overall arrangement of a system according to the fourth embodiment.
Figure 17:
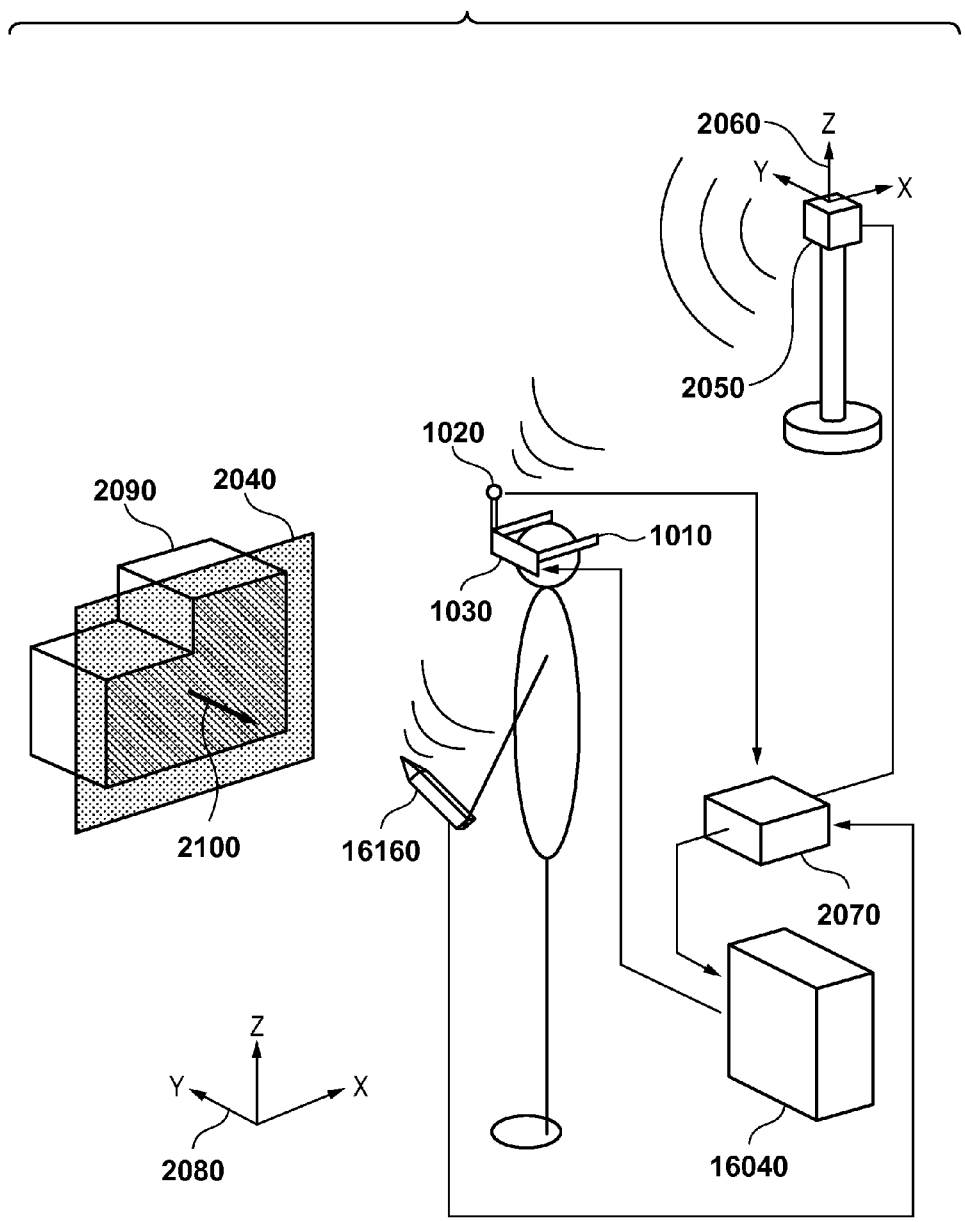
FIG. 17 is a view showing the outer appearance of the system according to the fourth embodiment.

FIG. 16 is a block diagram showing the overall arrangement of a system according to the fourth embodiment. FIG. 17 is a view showing the outer appearance of the system according to the fourth embodiment. In FIGS. 16 and 17, the same reference numerals as those in FIGS. 1 and 2 denote the same parts, and a description thereof will not be repeated.

Similarly to that described above, an operation unit 16160 includes an operation unit position and orientation measurement unit 16020 that is a magnetic sensor similar to the head position and orientation measurement unit 1020. The operation unit position and orientation measurement unit 16020 measures a change of a magnetic field corresponding to the position and orientation of the operation unit position and orientation measurement unit 16020, and sends the measurement result to a sensor controller 2070. The sensor controller 2070 generates, from the measurement result, a signal value representing the position and orientation of the operation unit position and orientation measurement unit 16020 in the sensor coordinate system, and sends the signal value to an information processing apparatus 16040.

The operation unit 16160 also includes an event input unit 16150 that is operated by a user in order to generate an event. For example, the event input unit 16150 is a button that can be pressed. When the user wants to generate an event, he presses this button. If this button is pressed, the operation unit 16160 generates an event and outputs it to the information processing apparatus 16040.

<Apparatus Operation>

Figure 18:
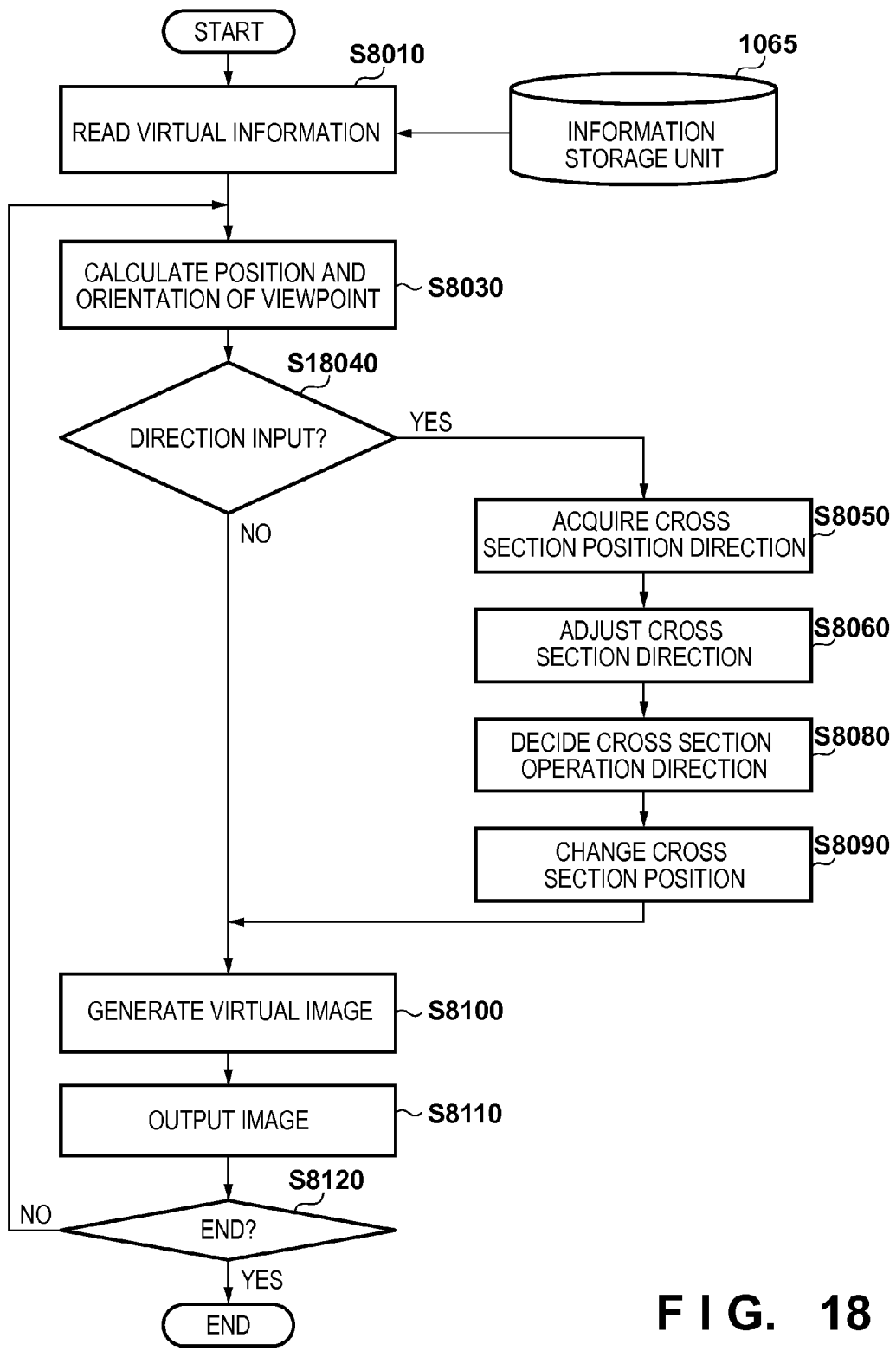
FIG. 18 is a flowchart showing processing to be performed by an information processing apparatus 16040 according to the fourth embodiment.

FIG. 18 is a flowchart showing processing to be performed by the information processing apparatus 16040 according to the fourth embodiment. In the flowchart shown in FIG. 18, the same reference numerals as those in FIG. 8 denote the same processes, and a description thereof will not be repeated.

In step S18040, an operation direction acquisition unit 16090 calculates the position and orientation of the operation unit 16160 in a virtual space coordinate system 2080, similarly to the viewpoint position and orientation calculation unit 1050 in step S8030.

Figure 19:
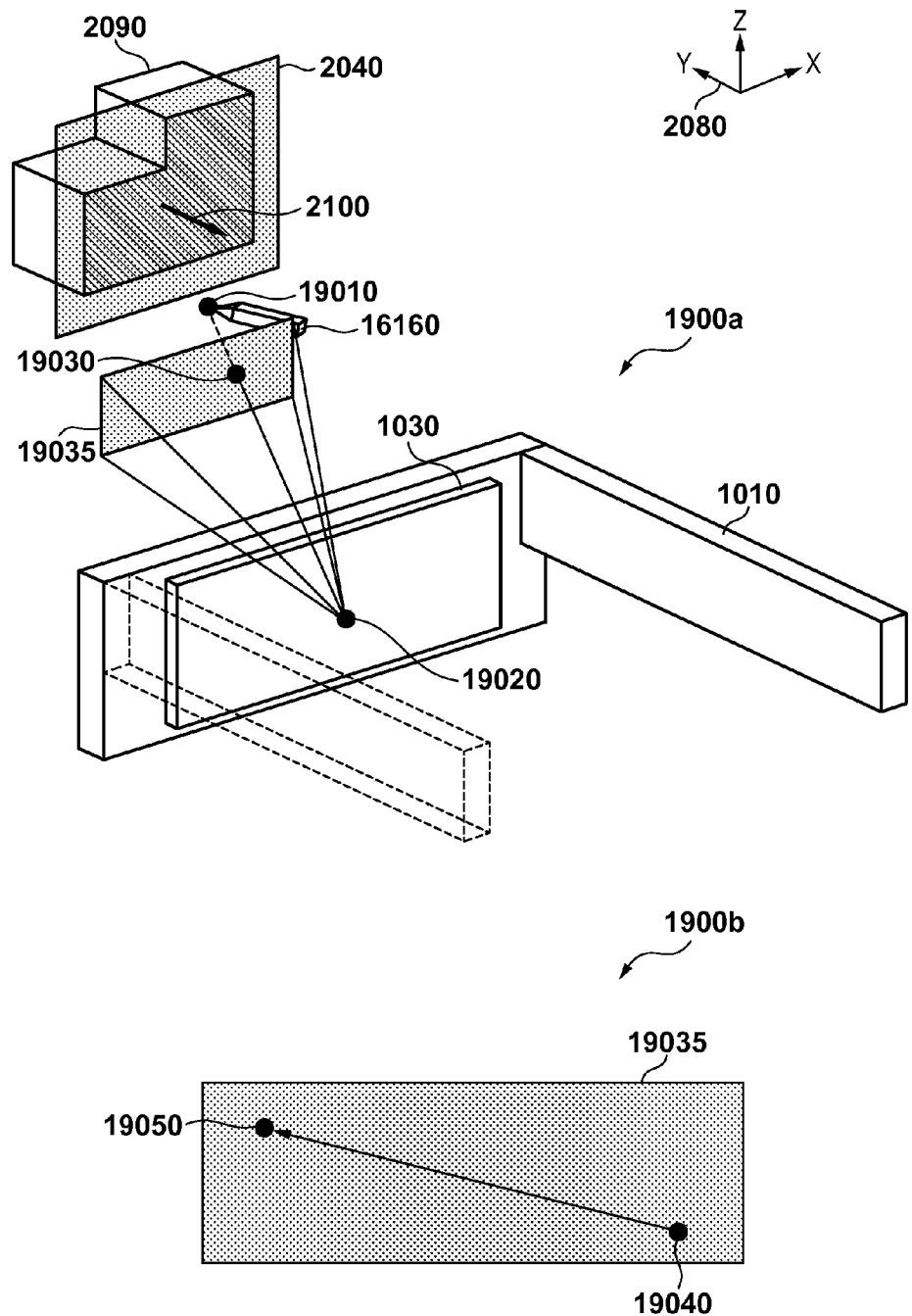
FIG. 19 is a view for explaining an operation in step S18040.

FIG. 19 is a view for explaining the operation in step S18040. First, as represented by 1900*a*, a point 19030 is calculated, at which a straight line connecting a position 19010 of the operation unit 16160 and a viewpoint 19020 crosses a projection plane 19035 on which a virtual object viewed from a viewpoint in a virtual space is projected.

Then, as represented by 1900*b*, the vector of a straight line having, as a start point, a previous position 19040 of the operation unit 16160 on the projection plane and, as an end point, a current position 19050 on the projection plane is calculated to determine an up, down, left, or right input direction on the projection plane. When the previous position on the projection plane and the current position on the projection plane are completely the same, it is preferable not to start calculation until the current position on the projection plane changes to a different position. Since the vector of the straight line is a two-dimensional vector on the projection plane, it suffices to determine the up, down, left, or right input direction based on the absolute values of the X and Y components of the vector. That is, a direction in which the absolute value increases is determined as an input direction.

Note that various other methods are conceivable as the method for determining an operation direction by the operation direction acquisition unit. For example, a vector obtained by projecting the current indication direction of the operation unit 16160 on the projection plane 19035 may be directly used in determination as the up, down, left, or right input direction.

Alternatively, specific keys of a keyboard may be assigned to up, down, left, and right directions and used in determination of the up, down, left, or right input direction. The moving direction of a mouse and a click event may also be used in determination of the up, down, left, or right input direction. An audio input may also be used in determination of the up, down, left, or right input direction. Further, the motion of the hand may be captured, and a gesture determined from the successive hand images may be used in determination of the up, down, left, or right input direction.

As described above, according to the fourth embodiment, an observer (operator) can operate a three-dimensional virtual object arranged in a virtual space by using the operation unit (indicator) that performs an operation based on a change of the position and orientation of the operation unit itself. As in the first embodiment, the fourth embodiment can implement a natural cross-sectional operation with respect to the three-dimensional virtual object arranged in the virtual space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-006217, filed Jan. 16, 2014, which is hereby incorporated by reference herein in its entirety.

What is claimed is:

1. An information-processing apparatus comprising:
an acquisition unit configured to acquire a line-of-sight direction of an observer who observes a first three-dimensional virtual object having a first cross section, arranged in a virtual space and having at least one cross section;
an image generation unit configured to generate, based on the line-of-sight direction of the observer and a first normal vector of the first cross section, a second three-dimensional virtual object having a second cross section, wherein a second normal vector which is a normal vector of the second cross section is different from the first normal vector;
an output unit configured to output an image of the second three-dimensional virtual object generated by said image generation unit; and
an operation unit configured to accept an indication from the observer to move the second cross section,
wherein said image generation unit is operable to generate the second three-dimensional virtual object in a state in which the second cross section is moved by a predetermined distance in a direction of the normal vector of the second cross section based on an operation by said operation unit,
said operation unit is configured to accept an indication of a first direction, an indication of a second direction opposite to the first direction, an indication of a third direction perpendicular to the first direction, and an indication of a fourth direction opposite to the third direction, and in a case in which an angle $\beta$ formed by the line-of-sight direction and a normal direction of the second cross section falls within a first angle range, said image generation unit is operable to generate the second three-dimensional virtual object in the state in which the second cross section is moved in a first moving direction based on the indication of the first direction in said operation unit and to generate the second three-dimensional virtual object in the state in which the second cross section is moved in a second moving direction opposite to the first moving direction based on the indication of the second direction in said operation unit, in a case in which the angle $\beta$ falls within a second angle range different from the first angle range, said image generation unit is operable to generate the second three-dimensional virtual object in the state in which the second cross section is moved in the second moving direction based on the indication of the first direction in said operation unit and to generate the second three-dimensional virtual object in the state in which the second cross section is moved in the first moving direction based on the indication of the second direction in said operation unit, in a case in which the angle $\beta$ falls within a third angle range different from the first angle range and the second angle range, and a sign of a value of an outer product of a vector of the line-of-sight direction and the normal vector of the second cross-section is positive, said image generation unit is operable to generate the second three-dimensional virtual object in the state in which the second cross section is moved in a third moving direction based on the indication of the third direction in said operation unit and to generate the second three-dimensional virtual object in the state in which the second cross section is moved in a fourth moving direction opposite to the third moving direction based on the indication of the fourth direction in said operation unit, and in a case in which the angle $\beta$ falls within the third angle range and the sign of the value of the outer product of the vector of the line-of-sight direction and the normal vector of the second cross-section is negative, said image generation unit is operable to generate the second three-dimensional virtual object in the state in which the second cross section is moved in the fourth moving direction based on the indication of the third direction in said operation unit and to generate the second three-dimensional virtual object in the state in which the second cross section is moved in the third moving direction based on the indication of the fourth direction in said operation unit.

2. The apparatus according to claim 1, wherein the second normal vector of the second cross section is a vector obtained by reversing the first normal vector of the first cross section.

3. The apparatus according to claim 1, wherein
the first angle range is $0°\leq\beta<(90-B)°$, where $0<B<90$,
the second angle range is $(90+B)°<\beta\leq180°$, and
the third angle range is $(90-B)°\leq\beta<(90+B)°$q.

4. The apparatus according to claim 1, wherein said operation unit is configured as a four-way selector key capable of indicating two axial directions.

5. The apparatus according to claim 1, wherein said output unit is configured to output the image of the second three-dimensional virtual object on a display device configured as a head-mounted display (HMD).

6. The apparatus according to claim 5, wherein
the head-mounted display (HMD) includes two display units configured to present images to respective right and left eyes of the observer, and
said image generation unit is operable to generate two images corresponding to the two respective display units.

7. The apparatus according to claim 6,
the head-mounted display (HMD) further includes two image-capturing units configured to capture a scene of a physical space from positions of the respective right and left eyes of the observer, and
said image generation unit is operable to generate an image in which the second three-dimensional virtual object in the virtual space is superimposed and displayed on two captured images obtained by the two image-capturing units as the two images corresponding to the two respective display units.

8. The apparatus according to claim 1, wherein said image generation unit is operable to determine the second normal vector based on a scalar product of the first normal vector and a vector which is determined on the basis of the line-of-sight direction of the observer and a position of the first cross section, and to generate the second three-dimensional virtual object having the second cross section.

9. An information processing method to be executed by an image-processing apparatus, comprising:
acquiring a line-of-sight direction of an observer who observes a first three-dimensional virtual object having a first cross section, arranged in a virtual space and having at least one cross section;
generating, based on the line-of-sight direction of the observer and a first normal vector of the first cross section, a second three-dimensional virtual object having a second cross section, wherein a second normal vector which is a normal vector of the second cross section is different from the first normal vector;
outputting an image of the generated second three-dimensional virtual object; and
accepting an indication from the observer at an operation unit to move the second cross section,
wherein the image-processing apparatus is operable to generate the second three-dimensional virtual object in a state in which the second cross section is moved by a predetermined distance in a direction of the normal vector of the second cross section based on an operation by the image-processing apparatus,
the operation unit is configured to accept an indication of a first direction, an indication of a second direction opposite to the first direction, an indication of a third direction perpendicular to the first direction, and an indication of a fourth direction opposite to the third direction, and
in a case in which an angle β formed by the line-of-sight direction and a normal direction of the second cross section falls within a first angle range, the image-processing apparatus is operable to generate the second three-dimensional virtual object in the state in which the second cross section is moved in a first moving direction based on the indication of the first direction in the operation unit and to generate the second three-dimensional virtual object in the state in which the second cross section is moved in a second moving direction opposite to the first moving direction based on the indication of the second direction in the operation unit,
in a case in which the angle β falls within a second angle range different from the first angle range, the image-processing apparatus is operable to generate the second three-dimensional virtual object in the state in which the second cross section is moved in the second moving direction based on the indication of the first direction in the operation unit and to generate the second three-dimensional virtual object in the state in which the second cross section is moved in the first moving direction based on the indication of the second direction in the operation unit,
in a case in which the angle β falls within a third angle range different from the first angle range and the second angle range, and a sign of a value of an outer product of a vector of the line-of-sight direction and the normal vector of the second cross-section is positive, the image-processing apparatus is operable to generate the second three-dimensional virtual object in the state in which the second cross section is moved in a third moving direction based on the indication of the third direction in the operation unit and to generate the second three-dimensional virtual object in the state in which the second cross section is moved in a fourth moving direction opposite to the third moving direction based on the indication of the fourth direction in the operation unit, and
in a case in which the angle β falls within the third angle range and the sign of the value of the outer product of the vector of the line-of-sight direction and the normal vector of the second cross-section is negative, the image-processing apparatus is operable to generate the second three-dimensional virtual object in the state in which the second cross section is moved in the fourth moving direction based on the indication of the third direction in the operation unit and to generate the second three-dimensional virtual object in the state in which the second cross section is moved in the third moving direction based on the indication of the fourth direction in the operation unit.

10. A non-transitory computer-readable storage medium storing a program for causing a computer to execute an information processing method according to claim 9 comprising the steps of:
acquiring a line-of-sight direction of an observer who observes a first three-dimensional virtual object having a first cross section, arranged in a virtual space and having at least one cross section;
generating, based on the line-of-sight direction of the observer and a first normal vector of the first cross section, a second three-dimensional virtual object having a second cross section, wherein a second normal vector which is a normal vector of the second cross section is different from the first normal vector;
outputting an image of the generated second three-dimensional virtual object; and
accepting an indication from the observer at an operation unit to move the second cross section,
wherein the program causes the computer to generate the second three-dimensional virtual object in a state in which the second cross section is moved by a predetermined distance in a direction of the normal vector of the second cross section based on an operation by the image-processing apparatus,
the operation unit is configured to accept an indication of a first direction, an indication of a second direction opposite to the first direction, an indication of a third direction perpendicular to the first direction, and an indication of a fourth direction opposite to the third direction, and in a case in which an angle β formed by the line-of-sight direction and a normal direction of the second cross section falls within a first angle range, the program causes the computer to generate the second three-dimensional virtual object in the state in which the second cross section is moved in a first moving direction based on the indication of the first direction in the operation unit and to generate the second three-dimensional virtual object in the state in which the second cross section is moved in a second moving direction opposite to the first moving direction based on the indication of the second direction in the operation unit, in a case in which the angle β falls within a second angle range different from the first angle range, the program causes the computer to generate the second three-dimensional virtual object in the state in which the second cross section is moved in the second moving direction based on the indication of the first direction in the operation unit and to generate the second three-dimensional virtual object in the state in which the second cross section is moved in the first moving direction based on the indication of the second direction in the operation unit, in a case in which the angle β falls within a third angle range different from the first angle range and the second angle range, and a sign of a value of an outer product of a vector of the line-of-sight direction and the normal vector of the second cross-section is positive, the program causes the computer to generate the second three-dimensional virtual object in the state in which the second cross section is moved in a third moving direction based on the indication of the third direction in the operation unit and to generate the second three-dimensional virtual object in the state in which the second cross section is moved in a fourth moving direction opposite to the third moving direction based on the indication of the fourth direction in the operation unit, and in a case in which the angle β falls within the third angle range and the sign of the value of the outer product of the vector of the line-of-sight direction and the normal vector of the second cross-section is negative, the program causes the computer to generate the second three-dimensional virtual object in the state in which the second cross section is moved in the fourth moving direction based on the indication of the third direction in the operation unit and to generate the second three-dimensional virtual object in the state in which the second cross section is moved in the third moving direction based on the indication of the fourth direction in the operation unit.

11. An information-processing apparatus comprising:

an acquisition unit configured to acquire a line-of-sight direction of an observer who observes a first three-dimensional virtual object having a first cross section, arranged in a virtual space and having at least one cross section;

an image generation unit configured to generate, based on the line-of-sight direction of the observer and a first normal vector of the first cross section, a second three-dimensional virtual object having a second cross section, wherein a second normal vector which is a normal vector of the second cross section is different from the first normal vector;

an output unit configured to output an image of the second three-dimensional virtual object generated by said image generation unit; and an operation unit configured to accept an indication from the observer to move the second cross section, wherein said image generation unit is operable to generate the second three-dimensional virtual object in a state in which the second cross section is moved in a direction of the second normal vector based on an operation by said operation unit, wherein said operation unit is configured to accept, from the observer, at least an indication of a first direction and an indication of a second direction opposite to the first direction, and in a case in which an angle α formed between a direction of the second cross section and an upward direction relative to the observer falls within a first angle range, said image generation unit is operable to generate the second three-dimensional virtual object in the state in which the second cross section is moved in a first moving direction based on the indication of the first direction in said operation unit and to generate the second three-dimensional virtual object in the state in which the second cross section is moved in a second moving direction opposite to the first moving direction based on the indication of the second direction in said operation unit, and in a case in which the angle α falls within a second angle range different from the first angle range, said image generation unit is operable to generate the second three-dimensional virtual object in the state in which the second cross section is moved in the second moving direction based on the indication of the first direction in said operation unit and to generate the second three-dimensional virtual object in the state in which the second cross section is moved in the first moving direction based on the indication of the second direction in said operation unit, and wherein the first angle range is $0° \leq α < (90-A)°$, where $0 < A < 90$, and the second angle range is $(90+A)° < α \leq 180°$.

* * * * *